United States Patent
Georgeson et al.

(10) Patent No.: US 10,814,480 B2
(45) Date of Patent: Oct. 27, 2020

(54) STABILIZATION OF TOOL-CARRYING END OF EXTENDED-REACH ARM OF AUTOMATED APPARATUS

(71) Applicant: The Boeing Company, Chicago, IL (US)

(72) Inventors: Gary E. Georgeson, Tacoma, WA (US); James J. Troy, Tacoma, WA (US); Scott W. Lea, Renton, WA (US); Daniel James Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 15/878,642

(22) Filed: Jan. 24, 2018

(65) Prior Publication Data

US 2018/0361571 A1 Dec. 20, 2018

Related U.S. Application Data

(63) Continuation-in-part of application No. 15/623,304, filed on Jun. 14, 2017.

(51) Int. Cl.
*G06F 19/00* (2018.01)
*B25J 9/10* (2006.01)
(Continued)

(52) U.S. Cl.
CPC ............... *B25J 9/1015* (2013.01); *B25J 5/00* (2013.01); *B25J 5/007* (2013.01); *B25J 9/109* (2013.01);
(Continued)

(58) Field of Classification Search
CPC ... B25J 9/1015; B25J 5/00; B25J 5/007; B25J 9/109; B25J 9/162; B25J 9/1692;
(Continued)

(56) References Cited

U.S. PATENT DOCUMENTS 6,231,280 B1 5/2001 Bullen
6,751,342 B2 6/2004 Shepard
(Continued)

FOREIGN PATENT DOCUMENTS

WO 2011149582 A1 12/2011
WO 2016174445 A1 11/2016

OTHER PUBLICATIONS

Yuhao Gao et al.: "The method of aiming towards the normal direction for robotic drilling", International Journal of Precision Engineering and Manufacturing, Korean Society for Precision Engineering, Springer, vol. 18, No. 6, Jun. 7, 2017, pp. 787-794.
(Continued)

*Primary Examiner* — Ronnie M Mancho
(74) *Attorney, Agent, or Firm* — Ostrager Chong Flaherty & Broitman P.C.

(57) ABSTRACT

Apparatus and methods that can be used to stabilize the distal end of an arm (and an end effector attached thereto) of an automated extended-reach tool-equipped assembly. Stabilization is provided by three or more stabilizers, each comprising a stationary part and a movable part. Each stationary part has a fixed location relative to the end effector; each movable part is translatably coupled to a respective stationary part and comprises a contactor disposed at a distal end of the movable part. When the stabilizers are actuated, the contactors are translated toward and into contact with the surface of the workpiece and then locked in place to stabilize the distal end of the arm and the end effector. During tool operation, the stabilizers reduce oscillation of the end effector (and all structure fixedly coupled thereto).

23 Claims, 30 Drawing Sheets

(51) Int. Cl.
    *B25J 5/00*      (2006.01)
    *B25J 9/16*      (2006.01)
    *F41A 31/02*     (2006.01)
    *B25J 15/00*     (2006.01)
    *B64F 5/10*      (2017.01)
    *F41H 11/16*     (2011.01)
    *F41H 11/32*     (2011.01)
    *B64F 5/40*      (2017.01)
    *B64F 5/60*      (2017.01)

(52) U.S. Cl.
    CPC ............ *B25J 9/162* (2013.01); *B25J 9/1692* (2013.01); *B25J 9/1697* (2013.01); *B25J 15/0019* (2013.01); *B25J 15/0095* (2013.01); *B64F 5/10* (2017.01); *F41A 31/02* (2013.01); *F41H 11/16* (2013.01); *F41H 11/32* (2013.01); *B64F 5/40* (2017.01); *B64F 5/60* (2017.01); *G05B 2219/39024* (2013.01); *G05B 2219/40298* (2013.01); *G05B 2219/45066* (2013.01); *G05B 2219/45071* (2013.01)

(58) Field of Classification Search
    CPC .. B25J 9/1697; B25J 15/0019; B25J 15/0095; F41A 31/02; F41H 11/16; F41H 11/32; B64F 5/60; B64F 5/40; B64F 5/10; G05B 2219/39024; G05B 2219/40298; G05B 2219/45066; G05B 2219/45071
    USPC ........................................................ 700/245
    See application file for complete search history.

(56) References Cited

U.S. PATENT DOCUMENTS

| | | | |
|---|---|---|---|
| 6,826,299 B2 | 11/2004 | Brown et al. | |
| 6,990,215 B1 | 1/2006 | Brown et al. | |
| 7,075,084 B2 | 7/2006 | Thompson et al. | |
| 7,110,194 B2 | 9/2006 | Hubbs | |
| 7,119,338 B2 | 10/2006 | Thompson et al. | |
| 7,186,981 B2 | 3/2007 | Shepard et al. | |
| 7,194,358 B2 * | 3/2007 | Callaghan | B66B 5/0031 182/112 |
| 7,287,902 B2 | 10/2007 | Safai et al. | |
| 7,454,265 B2 | 11/2008 | Marsh | |
| 7,513,964 B2 * | 4/2009 | Ritter | G01N 25/72 156/64 |
| 7,587,258 B2 | 9/2009 | Marsh et al. | |
| 7,643,893 B2 | 1/2010 | Troy et al. | |
| 7,743,660 B2 | 6/2010 | Marsh et al. | |
| 7,783,376 B2 * | 8/2010 | Marsh | G01C 11/02 356/3 |
| 7,800,758 B1 * | 9/2010 | Bridges | G01B 11/002 356/482 |
| 7,859,655 B2 | 12/2010 | Troy et al. | |
| 8,043,033 B2 | 10/2011 | Clark | |
| 8,467,071 B2 | 6/2013 | Steffey et al. | |
| 8,713,998 B2 * | 5/2014 | Troy | G01N 29/043 73/104 |
| 8,892,252 B1 * | 11/2014 | Troy | G01B 11/14 700/213 |
| 9,410,659 B2 * | 8/2016 | Troy | F16M 11/18 |
| 9,856,037 B2 * | 1/2018 | Georgeson | F41A 31/02 |
| 2007/0269098 A1 * | 11/2007 | Marsh | G01C 11/04 382/141 |
| 2013/0135480 A1 | 5/2013 | Stratmann et al. | |
| 2015/0268033 A1 * | 9/2015 | Troy | G01S 5/16 702/95 |

OTHER PUBLICATIONS

T. Olsson et al.: "Cost-efficient drilling using industrial robots with high-bandwidth force feedback", Robotics and Computer Integrated Manufacturing, Elsevier Science Publishers BV., Barking, GB, vol. 26, No. 1, Feb. 1, 2010, pp. 24-38.

Felix Von Drigalski et al.: "Vibration-Reducing End Effector for Automation of Drilling Tasks in Aircraft Manufacturing", IEEE Robotics and Automation Letters, IEEE, vol. 2, No. 4, Oct. 1, 2017, pp. 2316-2321.

Troy Gray et al.: "Mobile Automated Robotic Drilling, Inspection, and Fastening", SAE Technical Paper Series, vol. 1, Sep. 17, 2013.

Tian Wei et al.: "Auto-normalization algorithm for robotic precision drilling system in aircraft component assembly", Chinese Journal of Aeronautics, vol. 26, No. 2, Mar. 7, 2013, pp. 495-500.

Maozhen Gong et al.: "A novel method of surface-normal measurement in robotic drilling for aircraft fuselage using three laser range sensors", Advanced Intelligent Mechatronics (SIM), 2012 IEEE/ASME International Conference on, IEEE, Jul. 11, 2012, pp. 450-455.

Christian Scheurer et al.: "Industrial implementation of a multi-task redundancy resolution at velocity level for highly redundant mobile manipulators", Robotics in the Era of Digitalisation: 47th International Symposium on Robotics: Jun. 21-22, 2016, Messe Munchen, Entrance East, Munich Germany, Jun. 21, 2016, pp. 109-117.

Yoram Koren et al.: "End-Effector Guidance of Robot Arms", CIRP Annals., vol. 36, No. 1, Jan. 1, 1987, pp. 289-292.

Extended European Search Report dated Dec. 5, 2018 in European Patent Application No. 18170755.5 (European counterpart to the instant patent application).

Extended European Search Report dated Dec. 5, 2018 in European Patent Application No. 18170741.5 (European counterpart to the instant patent application).

* cited by examiner

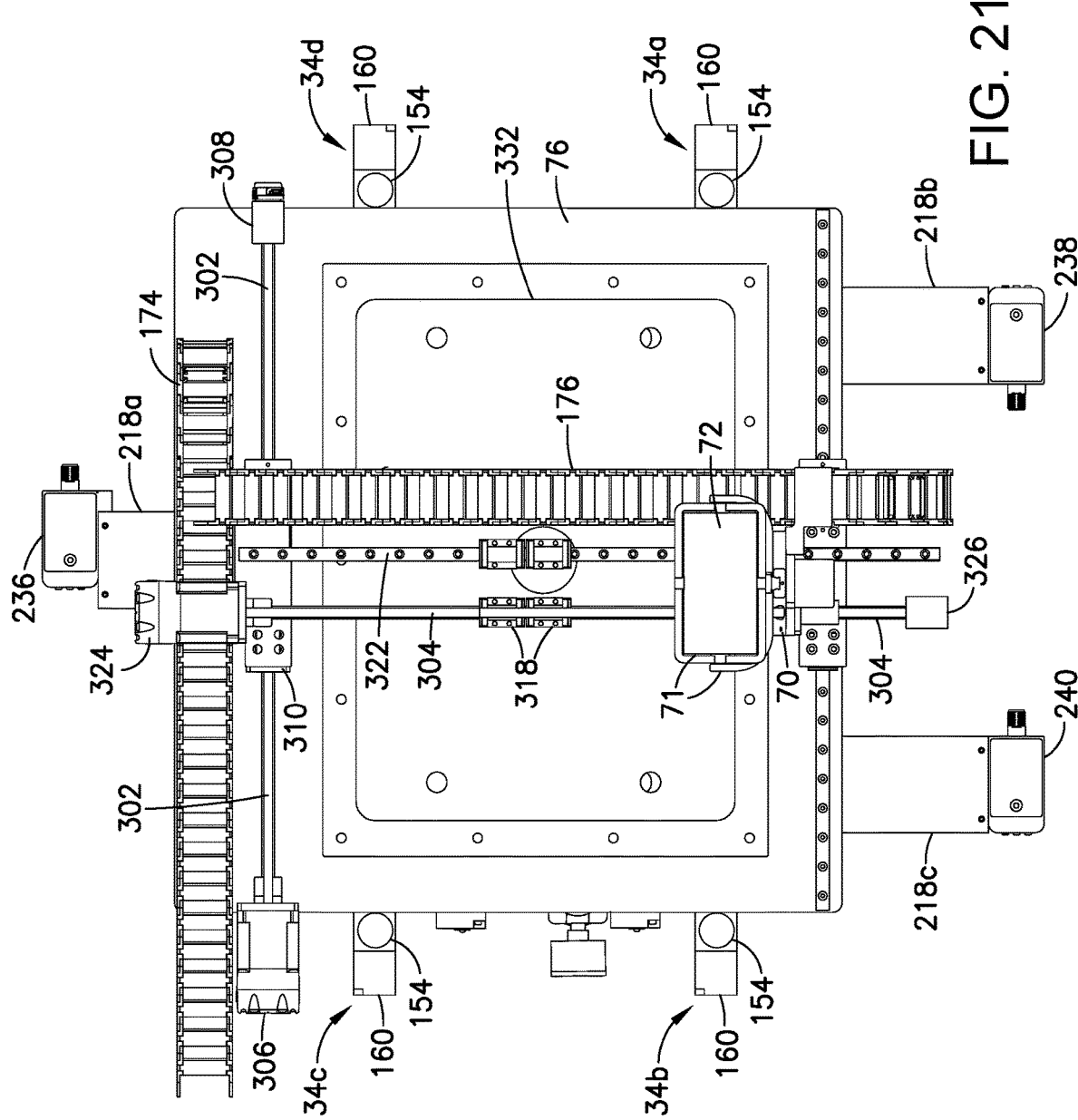

STABILIZATION OF TOOL-CARRYING END OF EXTENDED-REACH ARM OF AUTOMATED APPARATUS

RELATED PATENT APPLICATION

This application is a continuation-in-part of and claims priority from U.S. patent application Ser. No. 15/623,304 filed on Jun. 14, 2017.

STATEMENT REGARDING FEDERALLY SPONSORED RESEARCH OR DEVELOPMENT

This invention was made with Government support under Contract No. NNL09AA00A awarded by NASA. The Government has certain rights in this invention.

BACKGROUND

This disclosure relates to systems and methods for fabrication, repair and maintenance of large structures (such as aircraft) using a tool mounted on the end of an arm of an automated apparatus.

SUMMARY

The subject matter disclosed herein is directed to apparatus and methods that can be used to stabilize the distal end of an arm (and an end effector attached thereto) of an automated extended-reach tool-equipped assembly to enable the dimensional mapping, non-destructive inspection (NDI) and/or repair of large structures such as aircraft. (As used herein, the term "end effector" means the last link of an automated apparatus comprising an arm, at which endpoint a maintenance tool is attached.) The end effector is capable of holding and orienting a probe or sensor (e.g., NDI sensor unit, laser scanner, camera, etc.) or other tool (e.g., drill, sander, vacuum, "grabber", coating sprayer, etc.). The stabilization technology disclosed herein reduces oscillation of the end effector (and tool attached thereto) relative to a target object, while still allowing for a rapidly deployable on-ground robotic mobile platform. The stabilization devices disclosed herein can also be used to reduce load on robotic arm motors, which improves the power use efficiency and lifespan of those motors.

In accordance with various embodiments, stabilization is provided by three or more stabilizers each comprising a stationary part and a movable part. Each stationary part has a fixed location relative to an end effector; each movable part is translatably coupled to a respective stationary part and comprises a contactor disposed at a distal end of the movable part. When the stabilizers are actuated, the contactors are translated toward and into contact with the surface of the workpiece and then locked in place to stabilize the distal end of the arm and the end effector coupled thereto. During tool operation, the stabilizers resist movement of the end effector (and all structure fixedly coupled thereto) in a direction substantially parallel to the axes of the stabilizers (which may be mutually parallel) and toward the workpiece surface.

In accordance with some embodiments, each stabilizer comprises a telescopic tube and a spring that urges a contactor (e.g., a contact pad or bumper) against the surface of the workpiece. In accordance with other embodiments, each stabilizer comprises a pneumatic cylinder that urges a contactor against the surface of the workpiece. The stabilizers generate forces at the contact locations substantially perpendicular to the stabilizers to resist motion relative to the surface. Another approach for stabilization is to provide devices that attach to the surface of the workpiece by attraction, adhesion or gripping. For example, in accordance with various embodiments, the stabilization devices may employ suction, electrostatic attraction, releasable adhesive (like the strips used to mount removable hooks on walls), or a "gripper" that physically grabs a protuberance on the workpiece.

The technology disclosed herein enables modular, rapid, low-cost robotic use for aircraft and other large structure applications by providing stabilization at the distal end of an arm of an extended-reach automated apparatus. The disclosed technology overcomes one or more of the disadvantages which accompany some techniques for extending a robotic arm to a working location while maintaining positional precision, which disadvantages include excessive weight, complexity and cost and lack of modularity.

In accordance with one NDI application, a ground-crawling automated apparatus has an end effector configured to accept interchangeable NDI devices, such as an infrared thermography scanner and an ultrasonic transducer array scanner. In accordance with another NDI application, the automated apparatus has an end effector configured to accept an infrared thermography scanner having an ultrasonic transducer array scanner movably coupled thereto. In the first application, either scanner, and in the second application, the combined scanners can be stabilized using the apparatus disclosed herein. The ability to stabilize the distal end of an extended-reach arm enables the use of low-cost extended-reach robots for aircraft fabrication, repair and maintenance.

Although various embodiments of apparatus and methods for stabilizing an end effector coupled to a distal end of an extended-reach arm of an automated apparatus will be described in some detail below, one or more of those embodiments may be characterized by one or more of the following aspects.

One aspect of the subject matter disclosed in detail below is an automated apparatus comprising: an arm having a distal end; an end effector which is coupled to a distal end of the arm; a first tool which is coupled to the end effector; and a plurality of stabilizers each comprising a stationary part and a movable part, wherein: each stationary part has a fixed location relative to the end effector; and each movable part is translatably coupled to a respective stationary part and comprises a contactor disposed at a distal end of the movable part. Each contactor may comprise a fixed bumper or a pivotable contact pad. In either case, the contactors are preferably made of elastomeric material.

In accordance with one embodiment of the automated apparatus described in the preceding paragraph, each stabilizer of the plurality of stabilizers further comprises a spring, and for each stabilizer of the plurality of stabilizers: the stationary part comprises an outer tube; the movable part further comprises an inner shaft slidably disposed inside the outer tube; the contactor is attached to a distal end of the inner shaft; and the spring urges the inner shaft to translate in a direction so that the contactor moves further away from the end effector.

In accordance with another embodiment, for each stabilizer of the plurality of stabilizers: the stationary part comprises a base cylinder; the movable part further comprises a piston that is slidable inside the base cylinder and a piston rod connected to the piston; the contactor is attached to a distal end of the piston rod; and the stationary part further comprises a rod lock attached to the base cylinder and configured for locking the piston rod to prevent movement.

Another aspect of the subject matter disclosed in detail below is a method for performing a maintenance operation, comprising: (a) moving a robotic mobile platform to a first location where a tool at a distal end of an arm is able to reach a first area of interest on a surface of a target object; (b) configuring the robotic mobile platform such that an end effector is at a correct location relative to the first area of interest; (c) extending contactors of a plurality of stabilizers into contact with the surface of the target object, which stabilizers are coupled to the arm; (d) locking the contactors of the stabilizers in place to maintain the end effector at the correct location relative to the first area of interest; and (e) performing a first maintenance operation using the tool while the end effector is maintained at the correct location relative to the first area of interest. This method may further comprise: (f) unlocking the contactors of the stabilizers upon completion of the maintenance operation; (g) retracting the contactors of the stabilizers; (h) moving the robotic mobile platform to a second location where the tool is able to reach a second area of interest on the surface of the target object; (i) configuring the robotic mobile platform such that the end effector is at a correct location relative to the second area of interest; (j) extending contactors of a plurality of stabilizers into contact with the surface of the target object; (k) locking the contactors of the stabilizers in place to maintain the end effector at the correct location relative to the second area of interest; and (l) performing a second maintenance operation using the tool while the end effector is maintained at the correct location relative to the second area of interest.

A further aspect of the subject matter disclosed in detail below is a method for performing a maintenance operation, comprising: (a) coupling a tool to an end effector, which end effector in turn is coupled to a distal end of an arm of an automated apparatus; (b) activating the automated apparatus to perform an alignment operation that locates the tool at a location relative to an area of interest on a surface of a target object; (c) extending contactors of a plurality of stabilizers coupled to the distal end of the arm into contact with the surface of the target object while the tool is at the location; and (d) activating the tool to perform a maintenance operation while the contactors are in contact with the surface of the target object. This method further comprises locking the contactors of the stabilizers in place while they are in contact with the surface of the target object before activating the tool.

Yet another aspect is an automated apparatus comprising: a base platform comprising wheels; an arm movably coupled to the base platform and having a distal end; an end effector which is coupled to the distal end of the arm; a tool which is coupled to the end effector; and a plurality of stabilizers coupled to the tool or to the end effector, each stabilizer comprising a rod and a contactor disposed at a distal end of the rod, wherein the rod is selectively extendible or retractable and the contactor is made of elastomeric material. In accordance with some embodiments, each stabilizer comprises a pneumatic cylinder that is operable to extend or retract the rod and a rod lock attached to the pneumatic cylinder and configured for locking the rod to prevent movement.

Other aspects of systems and methods for stabilizing an end effector coupled to a distal end of an arm of an extended-reach automated apparatus are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 21 and 22 are diagrams representing front and side views respectively of the hybrid tool assembly depicted in FIG. 20.

Reference will hereinafter be made to the drawings in which similar elements in different drawings bear the same reference numerals.

DETAILED DESCRIPTION

Figure 1:
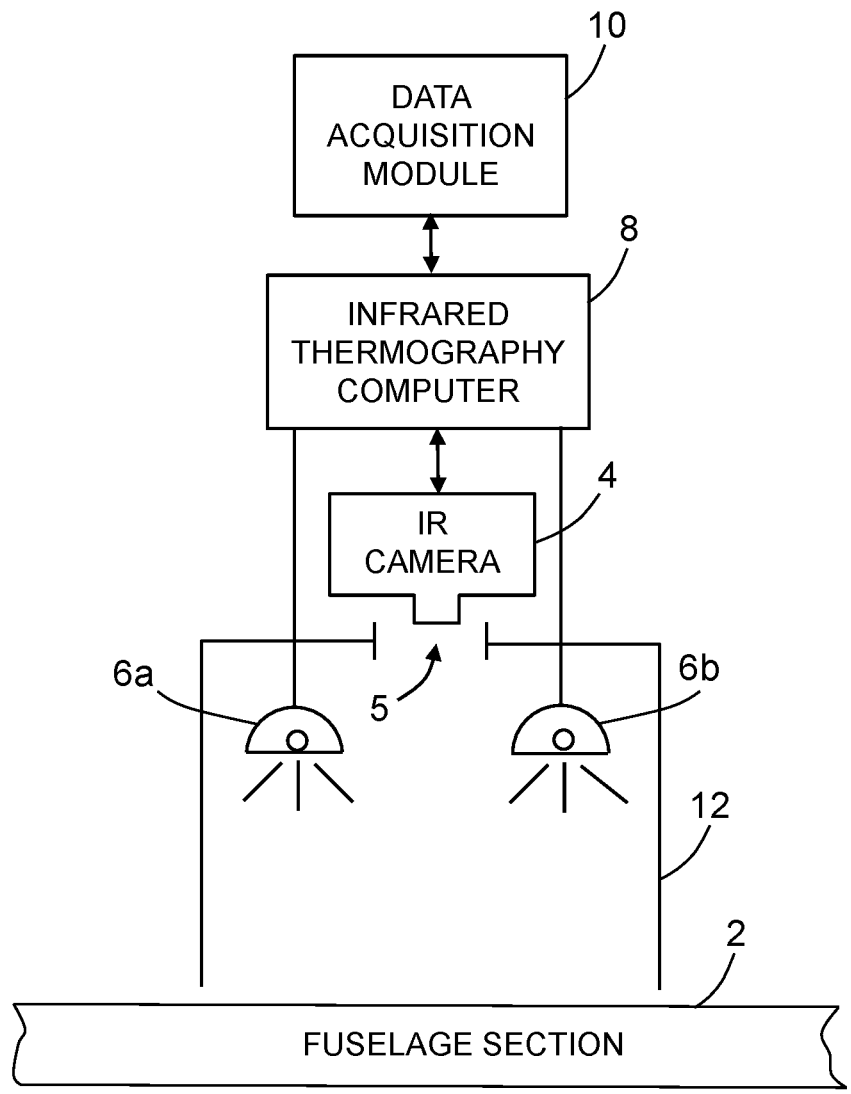
FIG. 1 is a block diagram identifying some components of a system for thermographic imaging of a fuselage section.

Many large structures, including aircraft, generally undergo routine maintenance, including inspection and/or repair of various components. It is known to use an automated tool-equipped apparatus (e.g., a robotic mobile platform) in fabrication, repair and maintenance of large structures. Typically, the tool is coupled to an end effector, which end effector in turn is coupled to a distal end of an arm of the automated apparatus. That arm may consist of a single rigid link or multiple rigid links rotatably coupled in sequence by joints or translatably coupled for extension/retraction.

The efficacy of an automated maintenance operation may be diminished if the distance between the end effector and the proximal end of the arm exceeds a specified threshold due to a loss of positional and orientational control at the distal end of the arm. More specifically, robots being developed for automated fabrication, repair, and inspection of composite aircraft structure must extend their reach beyond current multi-axis pedestal-mounted robots. At the same time, their precise activities (such as creating a scarf repair or scanning during a non-destructive inspection) demand a positionally stable distal working end.

At least some current solutions for stabilizing arms of automated apparatus add weight, size, and expense to the design and limit the usefulness, portability, and applicability of the apparatus. Other known solutions are to use vacuum track scanning systems (e.g., a scanning system in which the scanner is mounted to a bridge that moves along tracks adhered to the surface of the workpiece using vacuum adherence devices) or crawling robots that mount or attach to the surface (e.g., robotic crawlers having a plurality of independently controlled suction devices). These provide end effector stability, but require direct mount/dismount activities, which activities may have safety, ergonomic, potential damage and set-up time drawbacks.

The stabilization devices disclosed in some detail below may be installed on any robotic apparatus having an end effector mounted to a distal end of an articulated or non-articulated arm. In the examples described below, an end effector is pivotably coupled to a rigid extension arm, which arm is not articulated. However, in alternative embodiments the extension arm may have an additional actuated translational or rotational degree-of-freedom. Any one of a multiplicity of interchangeable maintenance tools of different types can be attached to and later detached from the end effector depending on which tool is most suitable for performing a scheduled maintenance operation.

As used herein, the term "tool" means any device that can be mounted to an end effector at the distal end of an arm of a robotic apparatus and used in the course of executing an automated fabrication, repair or maintenance procedure. Each maintenance tool incorporates elements to perform its intended function. Some examples of suitable maintenance tools include, but are not limited to, the following: (a) a video camera and a source of light to enable visual inspection for damage inside the limited-access space; (b) an NDI sensor unit (e.g., an array of ultrasonic transducers, an eddy current probe, microwave sensors, an infrared thermography unit, etc.); (c) a laser line scanner or a three-dimensional mapping head for dimensional measurement or mapping damage at a location; (d) other sensor or sensor array; (e) a mini-sander or grinder to remove material during a repair; (f) a vacuum to pick up foreign object debris or repair debris; (g) a spray head for painting or coating a repaired area; (h) an applicator for applying a coating; (i) a scaler; (j) a drill; and (k) other tools for maintenance or repair.

For the purpose of illustration, systems and methods for non-destructive inspection of fuselage sections made of composite material (e.g., a composite laminate made of fiber-reinforced plastic) will now be described in detail. More specifically, first a robotic apparatus having an infrared thermography subassembly attached to an end effector will be described. That robotic apparatus may be modified to also perform ultrasonic inspection by mounting an ultrasonic inspection assembly to the housing of the infrared thermography device. In accordance with a further embodiment, the ultrasonic inspection assembly can be mounted to the end effector of a robotic apparatus without an infrared thermography device.

Infrared thermography methods and devices make it possible to perform non-destructive testing of a material to detect defects, variations in the properties of the material, or differences in thickness of a coating or layer of the material. Infrared imaging can detect local variations in thermal diffusivity or thermal conductivity at or beneath the surface of the material. Infrared thermography can be used on metals, such as ferrous materials, including steel, or on non-metallic materials, such as plastics, ceramics, or composite materials.

Active thermography is used to nondestructively evaluate samples for sub-surface defects. It is effective for uncovering internal bond discontinuities, delaminations, voids, inclusions, and other structural defects that are not detectable by visual inspection of the sample. Generally, active thermography involves heating or cooling the sample to create a difference between the sample temperature and the ambient temperature and then observing the infrared thermal signature that emanates from the sample as its temperature returns to ambient temperature. An infrared camera is used because it is capable of detecting any anomalies in the cooling behavior, which would be caused by sub-surface defects blocking the diffusion of heat from the sample surface to the sample's interior. More particularly, these defects cause the surface immediately above the defect to cool at a different rate than the surrounding defect-free areas. As the sample cools, the infrared camera monitors and records an image time sequence indicating the surface temperature, thereby creating a record of the changes in the surface temperature over time.

Typically, the surface of the material is heated using a flash lamp and after a fixed period of time, a thermal image is taken of the surface of the heated material. Systems for thermographic heating typically employ xenon flashtubes and off-the-shelf photographic power supplies for sample excitation. An infrared camera images the infrared spectral radiance from the surface of the material, which is representative of the temperature of the surface of the material. Differences in temperature of the surface of the material indicate differing thermal characteristics of the material. These variations in thermal characteristics of the material indicate a possible material defect or the inclusion of a foreign material.

Structural thickness and stack-up geometry needed for infrared signature processing is obtained by knowing the exact location of the infrared camera's field of view on the surface of the fuselage section.

FIG. 1 is a block diagram identifying some components of a system for thermographic imaging of a fuselage section 2. This infrared thermographic inspection system comprises a digital infrared camera 4 having a lens that is directed through a camera lens aperture 5 in a hood 12, which is designed to form an enclosure adjacent to the surface being inspected. A pair of flash lamps 6a and 6b are disposed inside and in fixed spatial relationship to the hood 12. The flash lamps 6a and 6b produce flashes of light in response to trigger signals from an infrared thermography processing control computer (hereinafter "infrared thermography computer 8"), which also controls operation of the infrared camera 4. One example of a type of infrared camera 4 suitable for use with at least some of the embodiments disclosed herein includes a focal plane array (FPA) device configured to act as a spectral radiometer. Further details concerning other components that may be included in a flash lamp assembly of a type comprising an infrared camera, a pair of flash lamps and a hood can be found, for example, in U.S. Pat. No. 7,186,981.

In accordance with one method of thermographic inspection, first the flash lamps 6a and 6b are triggered to transfer heat to the composite material of the fuselage section 2. Preferably, during cooling of the composite material, the infrared camera 4 is triggered periodically to capture successive digital images of the varying spectral radiance of the heated portion of the fuselage section 2. Preferably, the thermally excited (heated) region of the composite material being inspected will cool monotonically after the excitation source removed until the sample reaches thermal equilibrium with its surroundings. The digital infrared imaging data captured by infrared camera 4 is received by the infrared thermography computer 8 for processing. The infrared thermography computer 8 is programmed to process infrared imaging data to detect and locate material edges, foreign objects under the surface of the material, or other material anomalies, such as delaminations and out-of-tolerance porosity. The infrared imaging data may be displayed on a display monitor (not shown in FIG. 1), which may be integrated with or separate from infrared thermography computer 8.

In accordance with the embodiment depicted in FIG. 1, the infrared thermography computer 8 may have digital image acquisition capabilities to convert the infrared imaging data from the infrared camera 4 to a format that can be analyzed and mathematically manipulated by the infrared thermography computer 8. An optional data acquisition module 10 may be incorporated in or separate from (as depicted in FIG. 1) the infrared thermography computer 8. The data acquisition module 10 may be used if the infrared camera 4 captures multiple spatially different images to generate a complete mosaic image of the surface of the composite structure when the latter is too large to fit in a single image frame. The infrared thermography computer 8 may be further programmed to analyze the infrared imaging data captured by the infrared camera 4. In particular, the time history of the surface temperature response of the fuselage section 2 as it returns to room temperature can be analyzed to detect the presence of defects in the composite material.

In the context of the specific application of inspecting fuselage sections, a non-destructive inspection system may comprise means for scanning the skin of the fuselage section from a vantage point external to the fuselage section. In the embodiments disclosed below, the external scanning means comprise a robot equipped with an infrared camera. The robot comprises a movable robot base and a robotic arm having a proximal end coupled to the robot base. The robot base may be a mobile holonomic crawler vehicle. An infrared thermography scanner is coupled to a distal end of the robotic arm. The infrared thermography scanner comprises an infrared camera and two or more flash lamps attached inside a hood. The hood may be sized to cover a rectangular area on the outer surface of the fuselage section. The infrared imaging data acquired from adjacent rectangular areas can be stitched together based on measurements of the respective locations of the robot base using a local positioning system. The stitching process may be performed on a real-time basis or may be performed at a later time.

Various embodiments of NDI systems configured to use the location alignment feedback concepts disclosed herein will now be described in some detail. In accordance with some embodiments, the NDI system is an automated platform with an end effector that is able to reach to the centerline of the top and bottom of the fuselage from either side of the airplane. This NDI system comprises a Mecanum-wheeled holonomic-motion base platform, a vertical extension mast carried by the base platform, a pivoting end effector, proximity sensors, and support for multiple types of NDI devices mounted on the end effector. The vertical support mast with a pivoting end effector on an extension arm allows the inspection of the full height of an airplane fuselage section. The holonomic-motion base platform allows the robot to quickly and efficiently re-position the NDI scanner unit along the length of the fuselage. Motion control software with distance sensor feedback enables automatic capture overlapping grid pattern scans. Reference position data is also captured to align the NDI scans with the appropriate airplane coordinate system. The system is relative easy to set up and use in either the automated or manual control mode. It can be configured to accept various types of NDI units mounted to its end effector, including: eddy current, ultrasonic, and infrared thermography (IRT) NDI sensors.

Figure 2:
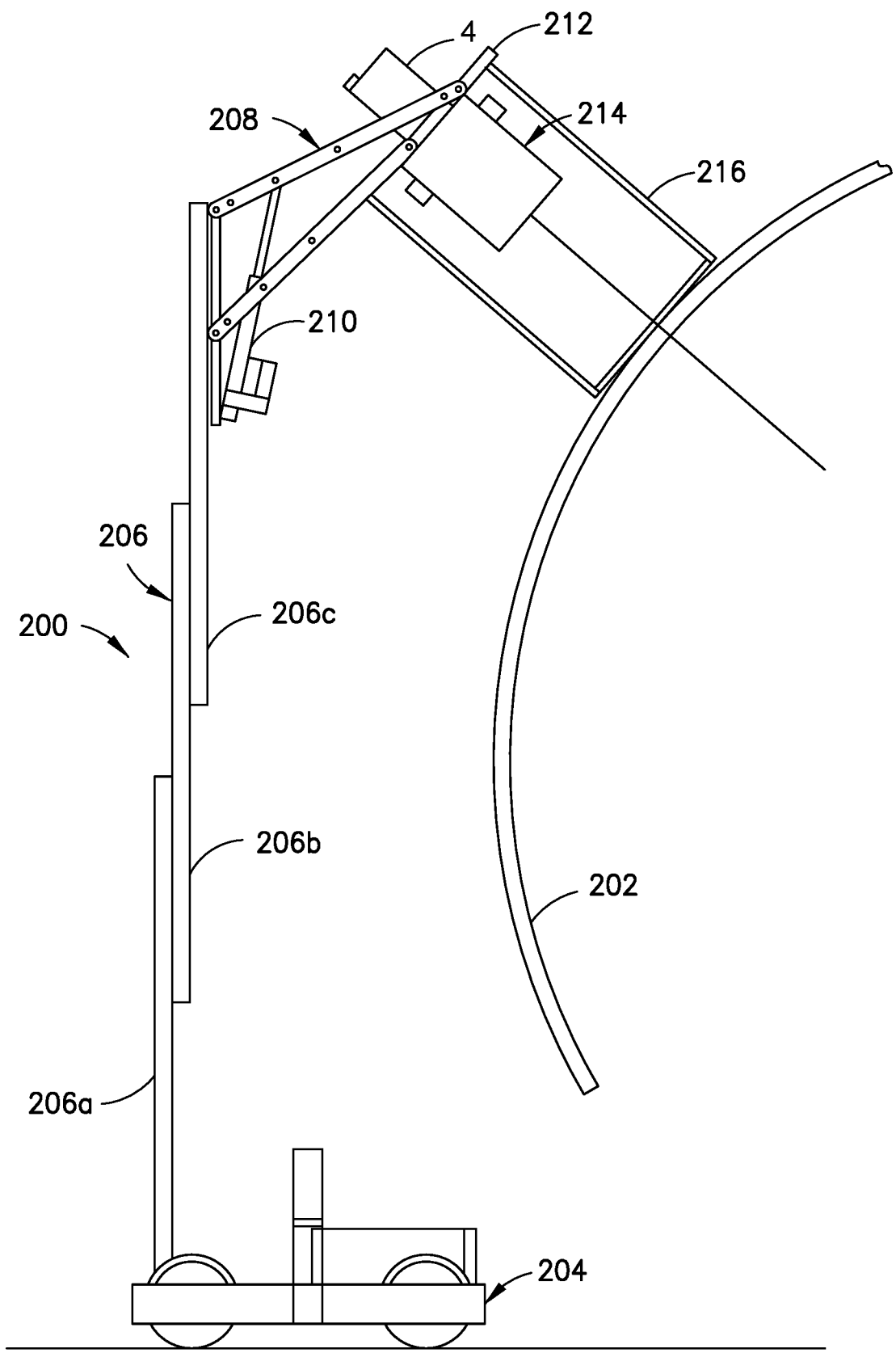
FIG. 2 is a diagram representing a side view of a ground-based robotic NDI mobile platform in accordance with one embodiment.

FIG. 2 is a diagram representing a side view of a ground-based robotic NDI mobile platform 200 in accordance with one embodiment. This platform comprises a holonomic-motion base platform 204, an infrared thermography (IRT) scanner 214, and an automated scanner support apparatus (carried by the holonomic-motion base platform 204) that is under the control of a robot controller (not shown). The automated scanner support apparatus comprises a vertical extendible mast 206 that can be extended and retracted as needed to change the elevation of the IRT scanner 214. The vertical extendible mast 206 comprises a first mast section 206a having a linear axis and one end fixedly coupled to a holonomic-motion base platform 204, a second mast section 206b having a linear axis and which is slidably coupled to the first mast section 206a for sliding along a line that is parallel to the axis of the first mast section 206a, and a third mast section 206c having a linear axis and which is slidably coupled to the second mast section 206b for sliding along a line that is parallel to the axis of the second mast section 206b. In accordance with one implementation, the vertical extension of the mast is controlled by a single motor and a cable-pulley system.

The ground-based robotic NDI mobile platform 200 depicted in FIG. 2 further comprises a four-bar linkage arm mechanism 208 to control the position and orientation of an end effector 212 which is pivotably coupled to the distal end of the four-bar linkage mechanism. The driver link of the four-bar linkage mechanism 208 is driven to rotate relative to the third mast section 206c by a motor-driven lead screw or hydraulic cylinder 210. The IRT scanner 214 is mounted to and rotates with the end effector 212. An IRT shroud 216 surrounds the IRT scanner 214 to isolate the volume of space between the IRT scanner 214 and a curved workpiece 202 (e.g., a fuselage section) from the surrounding environment.

Figure 3:
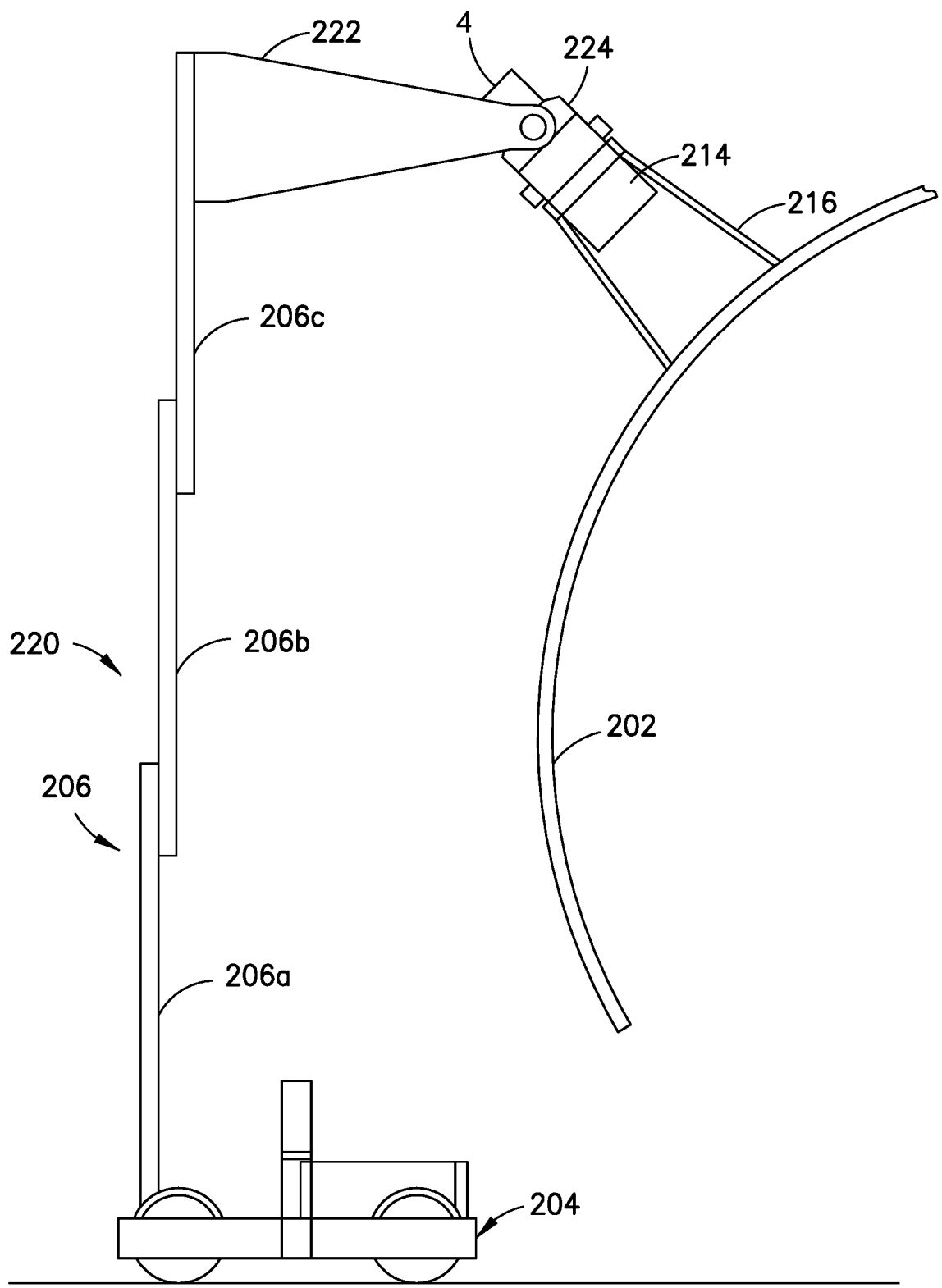
FIG. 3 is a diagram representing a side view of a ground-based robotic NDI mobile platform in accordance with another embodiment.
Figure 4:
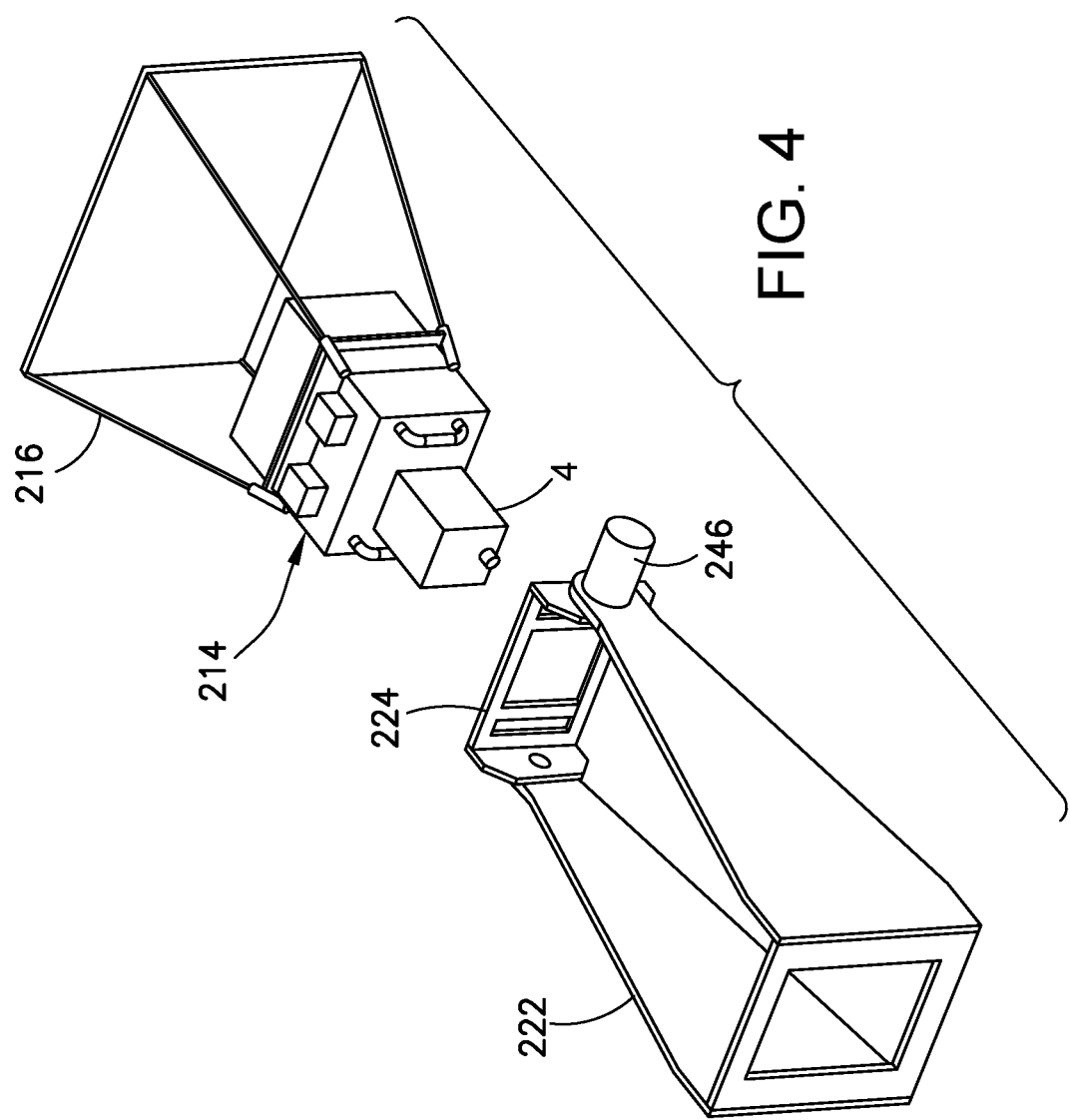
FIG. 4 is a diagram representing an exploded view of some components of the robotic NDI mobile platform depicted in FIG. 3.

FIG. 3 is a diagram representing a side view of a ground-based robotic NDI mobile platform 220 in accordance with another embodiment. This embodiment comprises a vertical extendible mast 206, a rigid extension arm 222 fixedly coupled to the third mast section 206c, and an end effector 224 pivotably coupled to the distal end of the two sides of the rigid extension arm 222. FIG. 4 is a diagram representing an exploded view of some components of the robotic NDI mobile platform 220 depicted in FIG. 3. This embodiment has independent programmable control over the extension height as well as the end effector pitch. Pitch rotation of the end effector 224 can be driven by a position control motor 246 (see FIG. 4) with a non-back-drivable gearbox (not shown).

Figure 5:
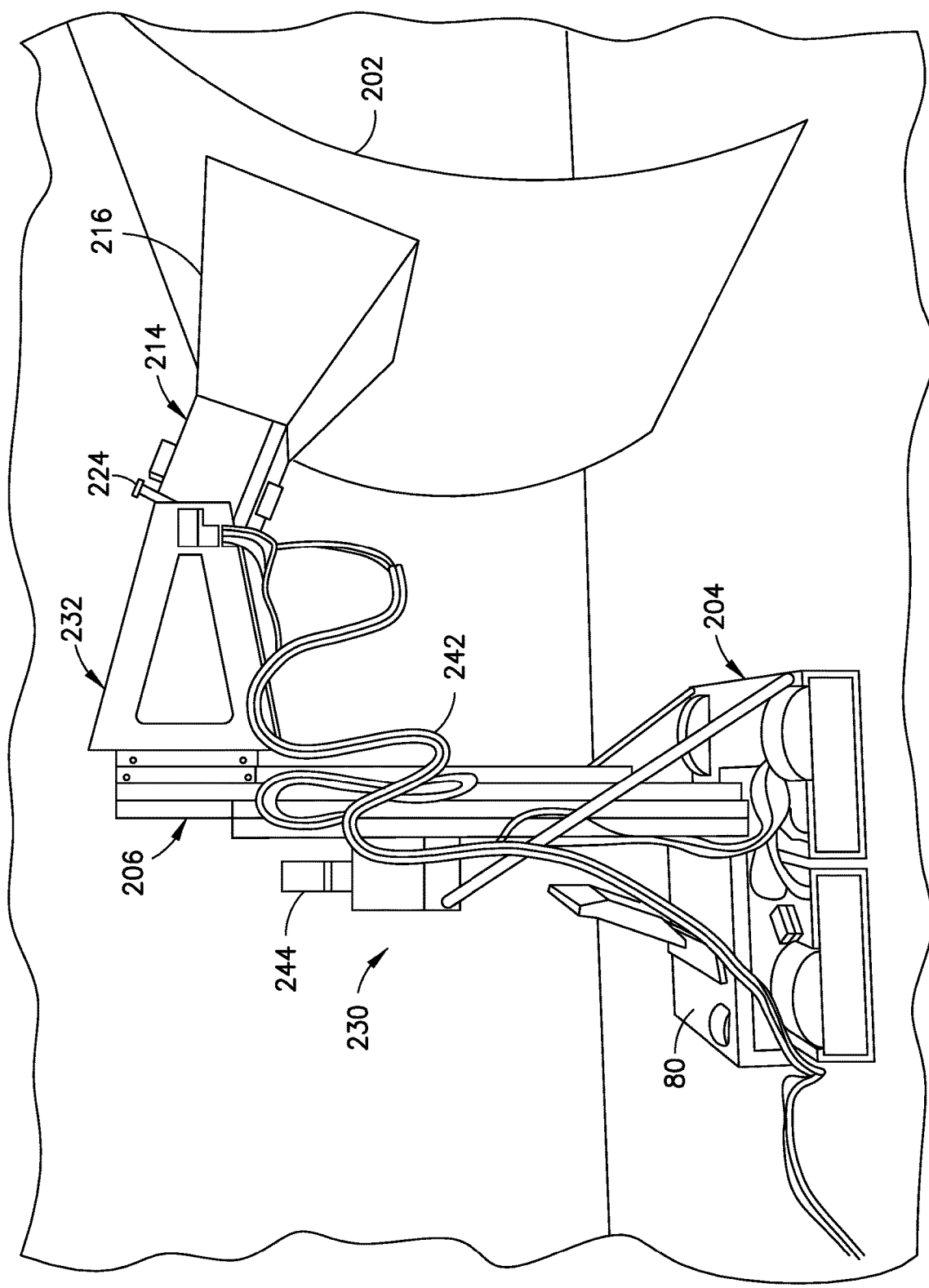
FIG. 5 is a diagram representing a perspective view of a ground-based robotic NDI mobile platform in the process of scanning a curved workpiece made of composite material. (Laser range meters mounted to the robot end effector are not shown in FIG. 5, but are shown in FIG. 6.)

FIG. 5 is a diagram representing a perspective view of a prototype of a ground-based robotic NDI mobile platform 230 in the process of scanning a curved workpiece 202 made of composite material. The IRT scanner 214 is mounted to an end effector 224, which end effector 224 in turn is pivotable about a pitch axis under the control of a robot controller 80. The end effector 224 is pivotably coupled to a rigid extension arm 232 which is in turn fixedly coupled to the uppermost mast section of the vertical extendible mast 206. The IRT scanner 214 sends acquired data to an infrared thermography computer (not shown in FIG. 5) by way of an electrical cable 242. The robotic NDI mobile platform 230 is also equipped with a warning light 244 which switches on and off when the system is enabled.

In accordance with one proposed implementation, the holonomic-motion base platform 204 employs four Mecanum wheels arranged with a Type A pair on one diagonal and a Type B pair on the other. The Type A Mecanum wheels differ from the Type B Mecanum wheels in that the tapered rollers of the former are oriented at different angles than the tapered rollers of the latter. Each Mecanum wheel can be driven to rotate by a respective independently controlled stepper motor. A Mecanum-wheeled vehicle can be made to move in any direction and turn by controlling the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type A wheels at the same rate but in the opposite direction of the rotation of the Type B wheels causes sideways movement. The holonomic-motion base platform 204 moves under the control of an onboard control computer (i.e., robot controller). The structure and function of a suitable Mecanum-wheeled holonomic-motion base platform is described in U.S. Pat. No. 9,410,659, the disclosure of which is incorporated by reference herein in its entirety.

In accordance with one embodiment, a multiplicity of sensors (not shown FIG. 5) are mounted around the periphery of the holonomic-motion base platform 204 to indicate the presence of obstacles in that specific region of the vehicle. The motion controller uses that sensor data to block additional motion from occurring in the direction associated with that particular sensor, but motion in the other directions is still allowed. Potential sensors include contact sensors, thru-beam sensors, and proximity sensors. This collision avoidance system would operate in a similar manner similar to what is described in U.S. Pat. No. 7,194,358.

As previously mentioned, the location alignment feedback process disclosed herein employs distance sensors to determine the position and orientation (i.e., the location) of the IRT scanner 214 relative to the target object (e.g., workpiece 202). At least three non-collinear distance measurement devices can be used to compute relative location in real-time. To mitigate any possibility of scratching the surface of the target object, laser range meters were selected instead of contact probes for use as distance sensors. In addition to close-range distance and angle guidance, the laser range meters also provide the advantage of longer range distance feedback to the platform motion controller for general navigation purposes.

Figure 6:
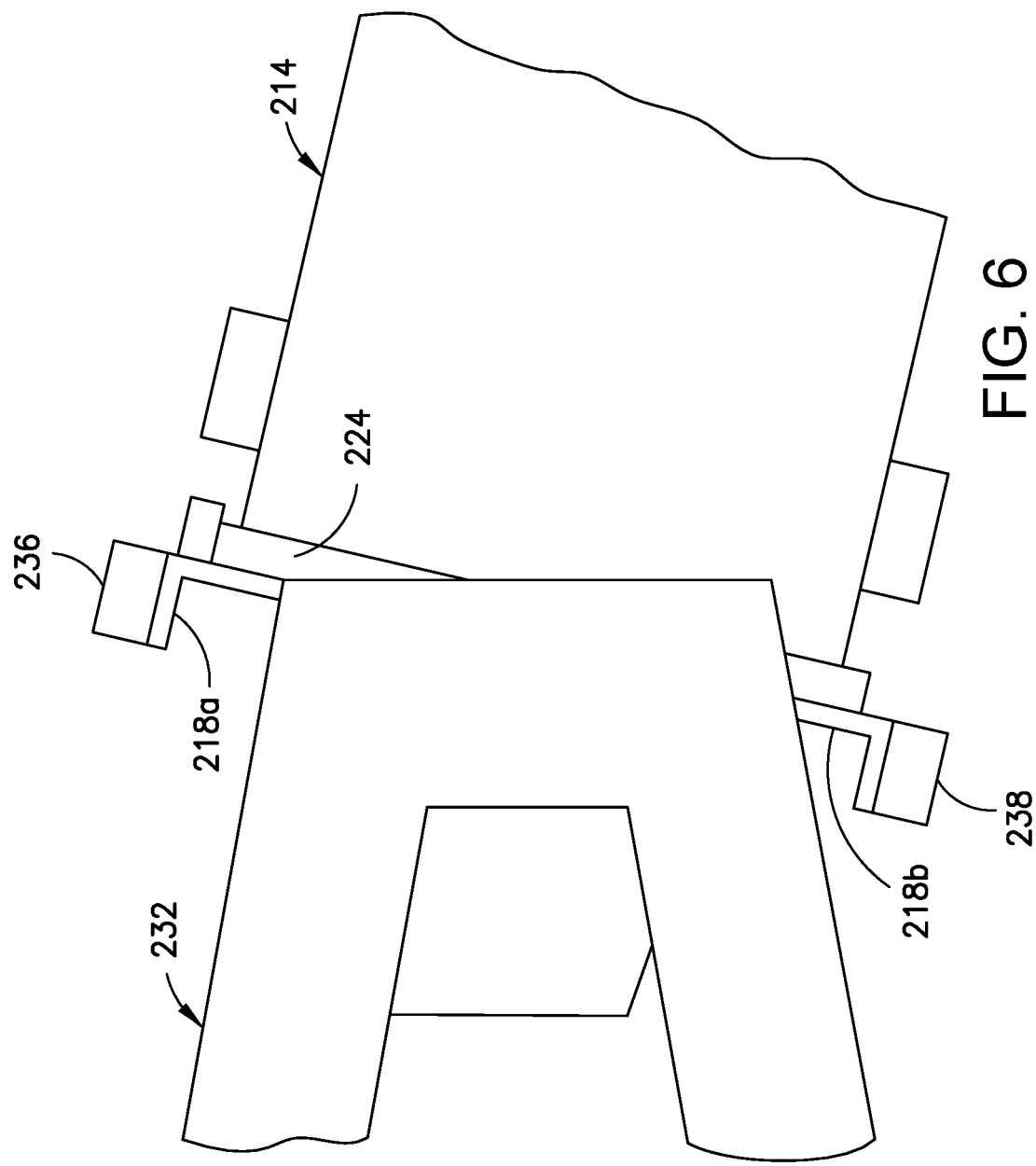
FIG. 6 is a diagram representing a side view of a portion of the robotic NDI mobile platform depicted in FIG. 5, which portion includes the end effector and three laser range meters mounted to the end effector.

In accordance with one implementation, three laser range meters (not shown in FIG. 5) are mounted to the end effector 224. FIG. 6 is a diagram representing a side view of a portion of the robotic NDI mobile platform depicted in FIG. 5, which portion includes the end effector 224 and three laser range meters mounted to the end effector 224. Only two of the three laser range meters (i.e., laser range meters 236 and 238) are visible in FIG. 6. The third laser range meter (i.e., laser range meter 240) is visible in FIG. 7. As seen in FIG. 6, the first laser range meter 236 is attached to an L-shaped mounting plate 218a, which is in turn attached to the end effector 224. Similarly, the second laser range meter 238 is attached to an L-shaped mounting plate 218b (shown in FIGS. 6 and 7), which is in turn attached to the end effector 224; and the third laser range meter 240 is attached to an L-shaped mounting plate 218c (shown in FIG. 7), which is in turn attached to the end effector 224.

Figure 7:
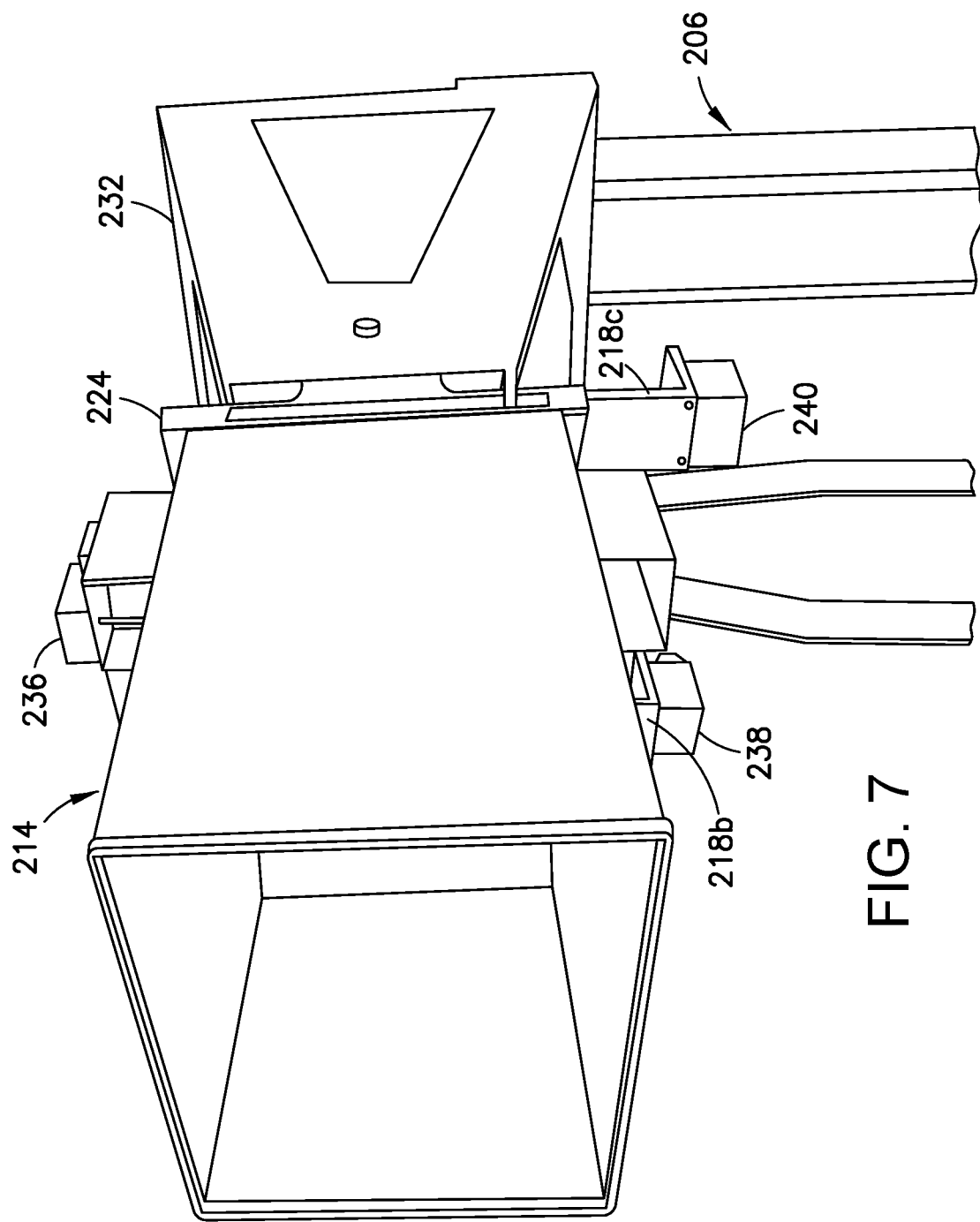
FIG. 7 is a diagram representing a perspective view of an infrared thermography scanner mounted to the end effector of the robotic NDI mobile platform depicted in FIG. 5.
Figure 8:
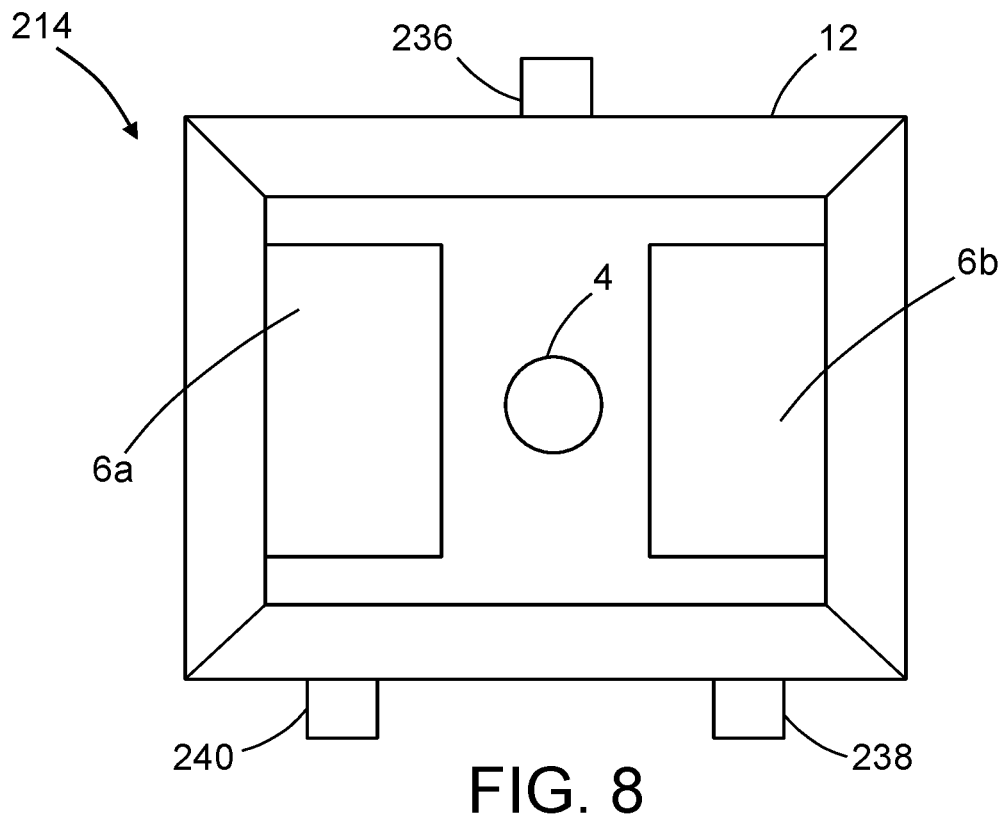
FIG. 8 is a diagram representing a front view of the infrared thermography scanner depicted in FIG. 7.
Figure 15A:
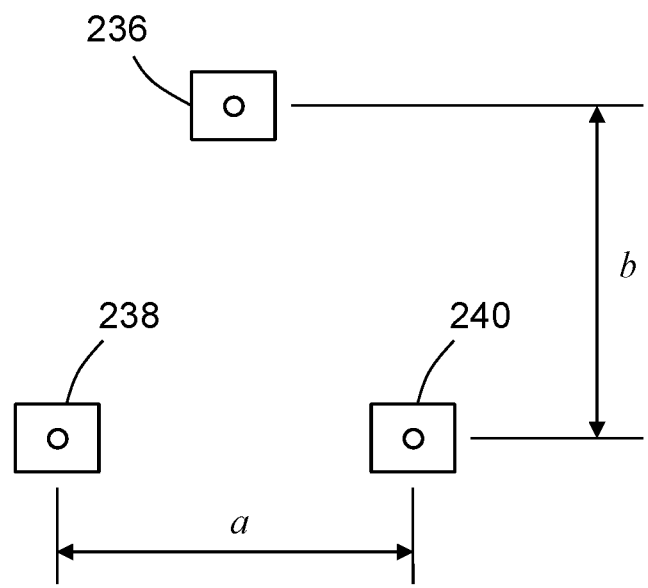
FIGS. 15A through 15C are diagrams representing front, side and top views respectively of three laser range meters arranged in a triangular pattern in a common plane and directed at respective spots on a surface of a target object, the laser range meters and spots being separated by respective distances.

FIG. 7 is a diagram representing a perspective view of the IRT scanner 214 (with shroud 216 removed) mounted to the end effector 224, which in turn is pivotably coupled to the rigid extension arm 232. As previously described, laser range meters 236, 238 and 240 are mounted to the end effector 224. As best seen in the front view of FIG. 8, laser range meter 236 is mounted at an elevation which is higher than the elevation of the highest point of the hood 12 of the IRT scanner 214, whereas the laser range meters 238 and 240 are mounted at an elevation which is lower than the elevation of the lowest point of the hood 12 of the IRT scanner 214, separated by a distance. Preferably the laser range meters 236, 238 and 240 are disposed at the vertices of an isosceles triangle. FIG. 15A shows an arrangement wherein the distance separating the laser range meters 238 and 240 (i.e., the base of the isosceles triangle) is a and the distance separating the laser range meter 236 and a point midway between the laser range meters 238 and 240 (i.e., the height of the isosceles triangle) is b.

The system depicted in FIGS. 5-7 uses an on-board alignment system to determine relative location (position and orientation) offsets of the end effector 224 to a target object. This process uses distance information from the laser range meters 236, 238 and 240 to compute relative location in real-time. The system then provides that data to a robot controller to produce the desired feedback-based motion of the end effector 224 (which may also include motion control of other parts of the robot).

One form of control that this process enables is semi-automated control to assist an operator in some aspect of alignment, such as orientation of the end effector 224 to make sure that it is always perpendicular to the surface of the target object or making sure that it is always a specific distance from the surface.

Figure 9:
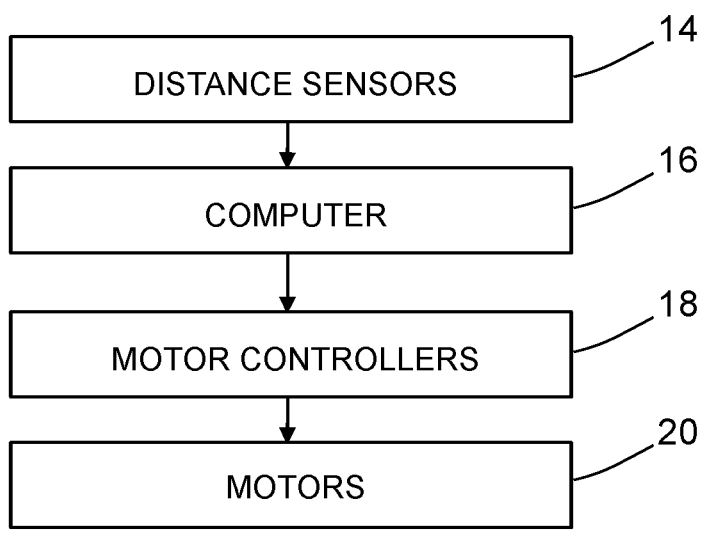
FIG. 9 is a block diagram identifying some components of an alignment system in accordance with some embodiments.

FIG. 9 is a block diagram identifying some components of an alignment system in accordance with some embodiments. The distance sensors 14 (e.g., laser range meters 236, 238 and 240) provide distance information to a computer 16 (e.g., a robot controller). The computer 16 is configured (e.g., programmed) to determine movements that will align the end effector 224 with the surface of the target object based on the distance information received from the distance sensors 14. These movements may include one or more of the following: moving the holonomic-motion base platform 204 to a new location; extending or retracting the vertical extendible mast 206; and pivoting the end effector 224 about the pitch axis. The robotic NDI mobile platform comprises a multiplicity of motors 20 which are controlled by respective motor controllers 18. The computer 16 sends command signals to selected motor controllers 18 to activate the robotic movements to align the end effector 224 with the surface of the target object.

Figure 10:
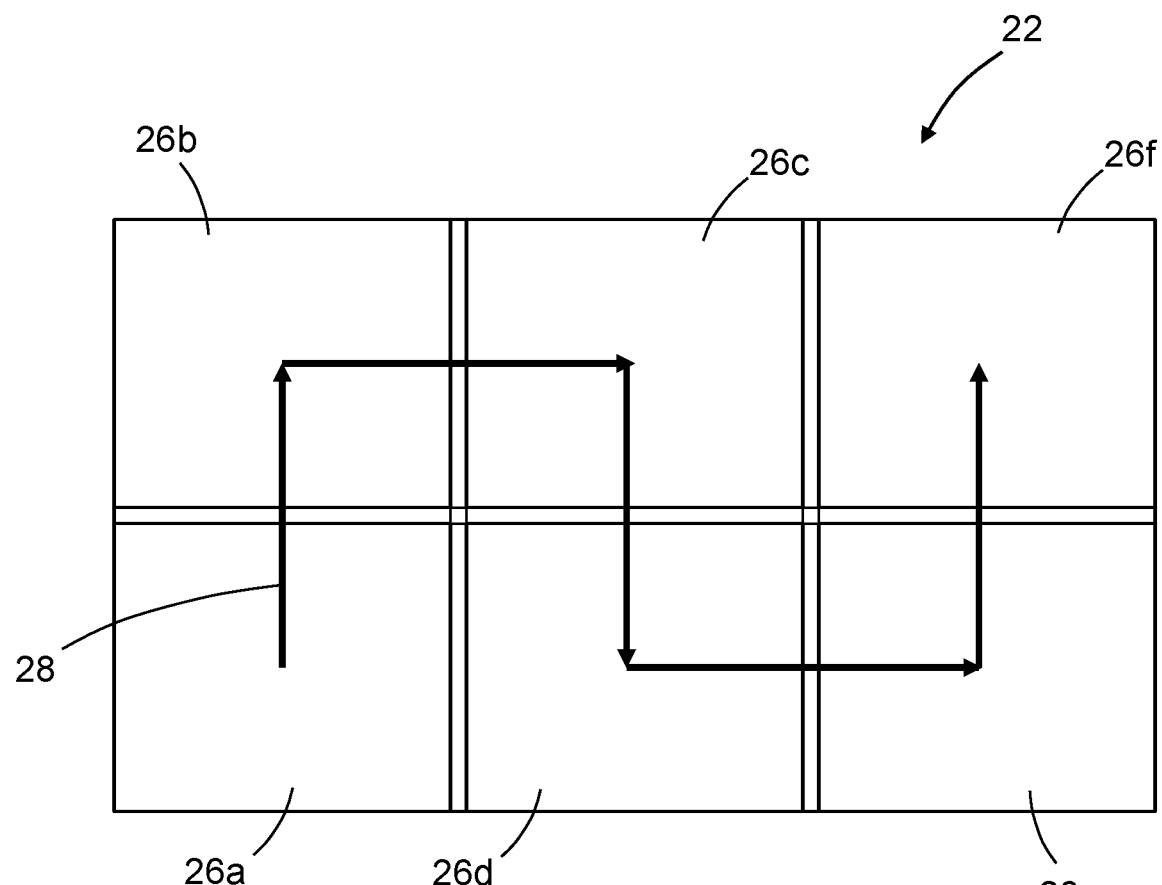
FIG. 10 is a diagram representing a scan pattern (3×2) for infrared thermographic inspection of a large workpiece.

Another form of control enabled by this process is fully automated motion control, where the operator specifies a high-level goal, such as an m×n grid pattern, and then the automated controller does the motion planning based on the high-level goal and feedback from the alignment system. For example, FIG. 10 is a diagram representing a 3×2 scan pattern 22 for IRT inspection of a large workpiece. First the IRT scanner acquires IRT data for scan area 26a. Then the IRT scanner is moved upward and stopped at a location where it acquires IRT data for scan area 26b. Preferably scan area 26b overlaps scan area 26a slightly to facilitate stitching the scans together and ensure that there are no gaps in the coverage. Next the IRT scanner is moved rightward and stopped at a location where it acquires IRT data for scan area 26c. Then the IRT scanner is moved downward and stopped at a location where it acquires IRT data for scan area 26d, followed by a move rightward to acquire IRT data for scan area 26e, and then a move upward to acquire IRT data for scan area 26f. The scan path 28 of the IRT scanner during this process is indicated by arrows in FIG. 10.

The alignment process provides an alternative to directly programming the individual motions of the robot. It also enables the system to adapt to unexpected changes in the environment, as well as providing collision avoidance ability for the end effector to achieve the desired position and orientation relative to the target surface without contacting it.

The automated process used here is based on a finite-state machine control application that manages the transition from one state to another based on external inputs. This framework enables the system to produce responses based on multiple types of inputs and the current state of the system. The various actions of the system used to produce the automatically generated motion path plan and scanner control signals are based on satisfying the criteria for transitions between one mode of operation and another. In accordance with one embodiment, a finite-state machine uses sensor feedback to trigger transitions between discrete sets of system states.

Figure 11:
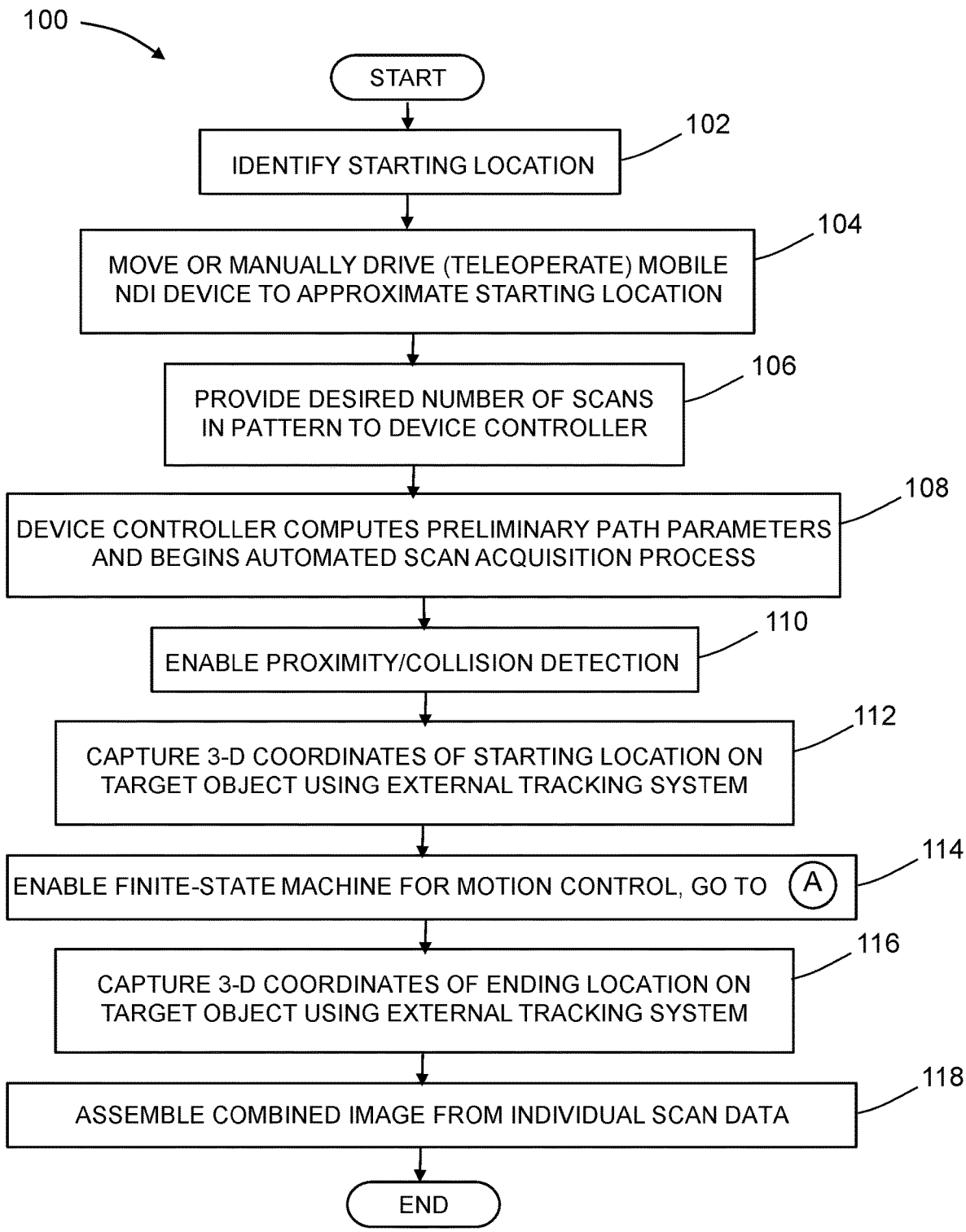
FIG. 11 is a flowchart identifying some steps of a method of non-destructive inspection that employs an end effector alignment process in accordance with one embodiment.
Figure 11A:
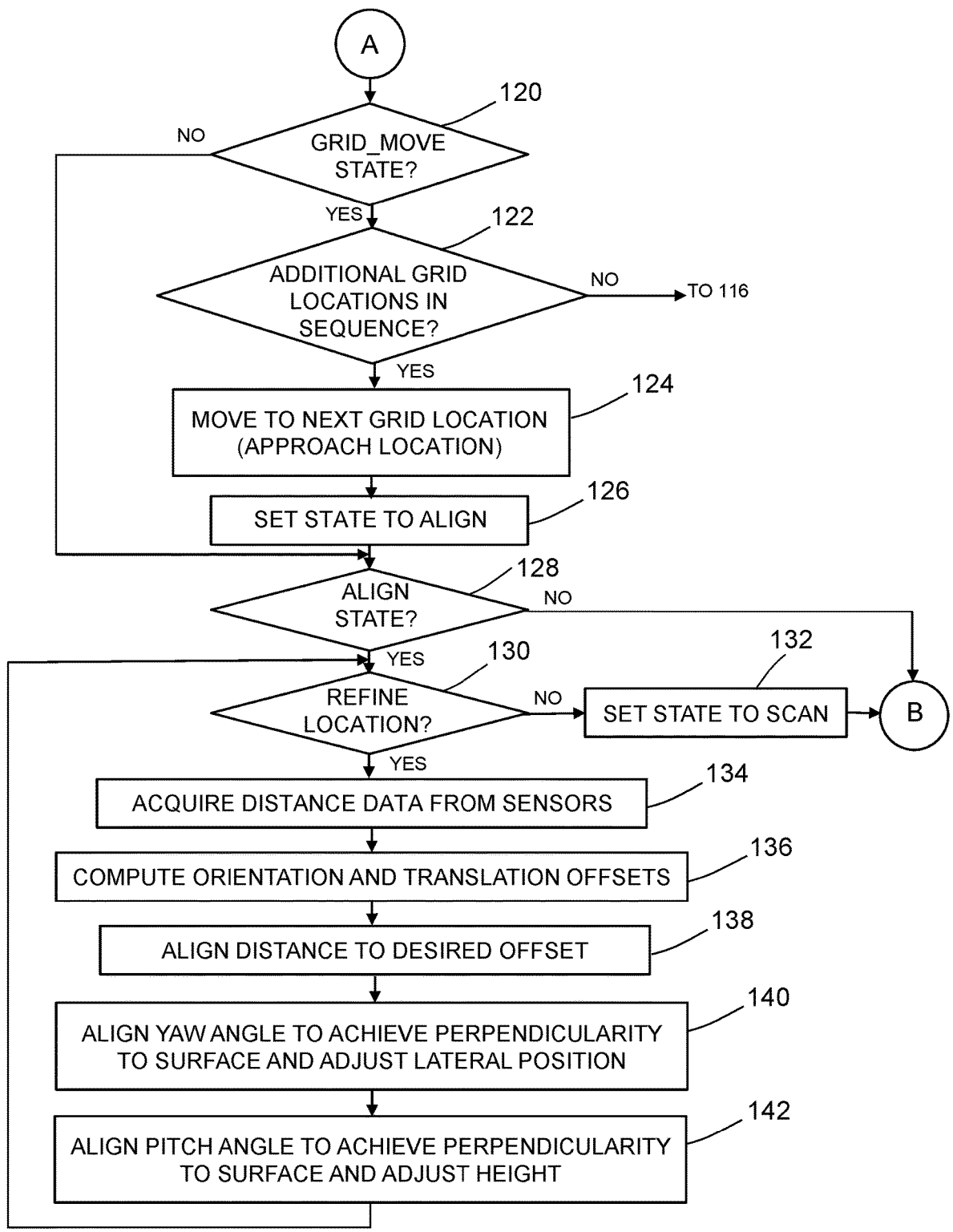
FIGS. 11A and 11B (in conjunction) form a flowchart identifying some steps performed by the alignment process finite-state machine employed in the method depicted at a high level in FIG. 11.
Figure 11B:
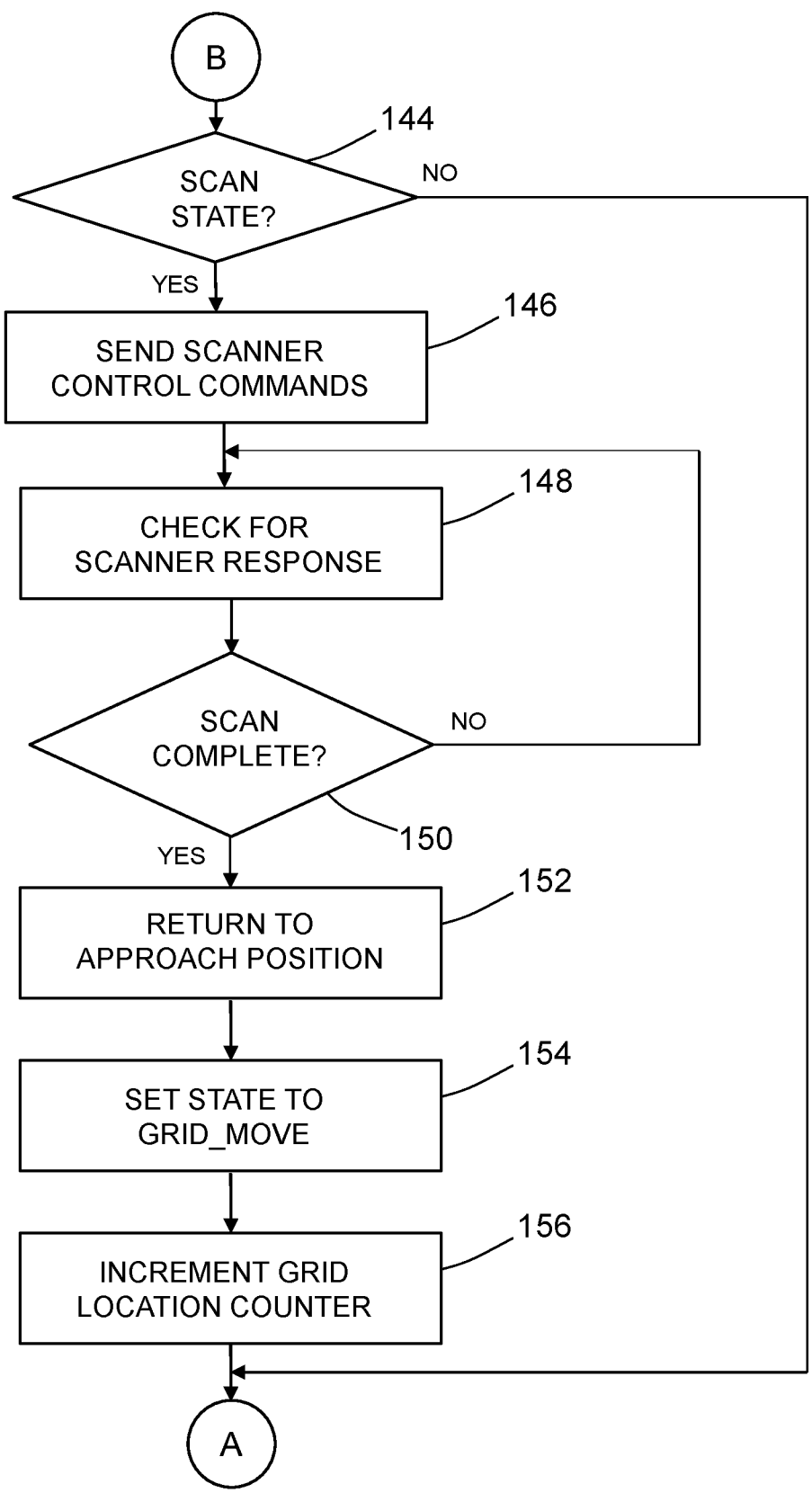

The process will now be described with reference to a robotic NDI mobile platform comprising a base platform (e.g., a holonomic-motion base platform) carrying a robotic arm having an NDI sensor (e.g., an IRT scanner) at its distal end, the movements of the base platform and the robotic arm being controlled by a device controller (e.g., a robot controller). FIG. 11 shows the high-level process for the overall operation of the system, and FIGS. 11A and 11B show the details associated with the alignment-bases aspects of the process. Digital signals sent between the robot controller and the NDI sensor control computer (e.g., infrared thermography computer 8 identified in FIG. 1) enable synchronization between the separate robot and NDI sensor systems.

FIG. 11 identifies some steps of a method 100 of non-destructive inspection that employs an end effector alignment process in accordance with one embodiment. To start the process, the system operator identifies a first location for the NDI sensor relative to the target object (step 102). This step can be accomplished by visual methods (by the operator), or automatically (with a pointing system like the LPS). Then the system operator can operate the base platform and robotic arm to move the NDI sensor to the approximate first location (step 104). The system operator provides the desired number of scans in the pattern to the device controller in step 106. This number will be compared to a count stored in a grid location counter, which counter is incremented each time a scan in the pattern is acquired. In step 108, the device controller computes preliminary path parameters and begins automated scan acquisition. The system operator also enables proximity/collision detection (step 110). Then the system operator captures the 3-D coordinates of the first location using an external tracking system (e.g., an LPS) (step 112). (The external tracking system has been previously calibrated so that its own 3-D coordinates relative to the coordinate system of the target object are known, which allows the LPS computer to compute the 3-D coordinates of the first location relative to the coordinate system of the target object.) Thereafter a finite-state machine for controlling the motion of the NDI sensor during the alignment process and during the scanning process is enabled (step 114) (i.e., go to A in FIG. 11A). (The finite-state machine will be described in the next paragraph with reference to FIGS. 11A and 11B.) After the NDI sensor has been aligned and the scan pattern has been completed, the system operator captures the 3-D coordinates of the ending location of the NDI sensor using the external tracking system (step 116). A combined image can then be assembled by stitching together the scan data from adjoining scans (step 118).

FIGS. 11A and 11B (in conjunction) form a flowchart identifying some steps performed by the finite-state machine employed in the method depicted at a high level in FIG. 11. A finite-state machine is a mathematical model of a process that can only be in one of a finite number of states at any given time.

In accordance with one proposed implementation, the robot controller first checks (i.e., determines) whether the finite-state machine (FSM) is set to the GRID_MOVE state or not (step 120). GRID_MOVE is the state where the robot is moving between the grid locations which are defined at a high level. For example, if the system operator wants the system to capture data in a 3×2 pattern, the robot will move along the scan path 28 seen in FIG. 10 to make a contiguous grid. If the robot controller determines in step 120 that the FSM is not in the GRID_MOVE state, the robot controller then proceeds directly to step 128. If the robot controller determines in step 120 that the FSM is in the GRID-MOVE state, the robot controller then determines whether there are additional grid locations in the sequence (step 122). This is accomplished by comparing the current count in the grid location counter to the preset number of scans to be acquired. If the robot controller determines in step 122 that there are no additional grid locations (i.e., the count equals the present number) in the sequence, the process returns to step 116 in FIG. 11. If the robot controller determines in step 122 that there are additional grid locations in the sequence (i.e., the count is less than the preset number), the robot moves to the next location of the unaligned NDI sensor (step 124), following which the state of the finite-state machine is set to ALIGN (step 126). In the next step, the robot controller determines whether the finite-state machine is set to the ALIGN state or not (step 128).

The ALIGN state is when the robot is using the three distance sensors to ensure that the pitch and yaw of the end effector are such that the aim axis of the NDI scanner is perpendicular to the surface of the target object. If the robot controller determines in step 128 that the finite-state machine is not in the ALIGN state, then the robot controller proceeds directly to step 144 in FIG. 11B. If the robot controller determines in step 128 that the finite-state machine is in the ALIGN state, then the robot controller determines whether the location of the NDI sensor needs to be refined or not (step 130). If the robot controller determines in step 130 that the location of the NDI sensor does not need to be refined (i.e., the aim axis of the NDI scanner is perpendicular to the surface of the target object), then the robot controller sets the state of the finite-state machine to SCAN (step 132) and proceeds directly to step 144 in FIG. 11B. If the robot controller determines in step 130 that the location of the NDI sensor does need to be refined (i.e., the aim axis of the NDI scanner is not perpendicular to the surface of the target object), then the robot controller performs the following steps in order: (a) acquires distance data from the distance sensors (step 134); (b) computes the orientation and translation offsets from the desired aligned location (step 136); (c) align the distance to the desired offset (step 138); (d) aligns the yaw angle of the end effector to achieve perpendicularity to the surface of the target object and adjust lateral position (step 140); (e) aligns the pitch angle of the end effector to achieve perpendicularity to the surface of the target object and adjust height (step 142); and (f) returns to step 130.

As previously described, if the robot controller determines in step 130 that the location of the NDI sensor does not need to be refined, then the robot controller sets the state of the finite-state machine to SCAN (step 132) and proceeds directly to step 144 in FIG. 11B. In step 144, the robot controller determines whether the finite-state machine is set to the ALIGN state or not. If the robot controller determines in step 144 that the finite-state machine is not in the SCAN state, then the robot controller returns to step 120 in FIG. 11A. If the robot controller determines in step 144 that the finite-state machine is in the SCAN state, then the robot controller sends scanner control commands (step 146) to the NDI scanner control computer (e.g., infrared thermography computer 8 identified in FIG. 1). The robot controller then checks for a scanner response (step 148) and determines whether the scan pattern has been completed or not (step 150). If the robot controller determines in step 150 that the scan pattern has not been completed, then the robot controller returns to step 148. If the robot controller determines in step 150 that the scan pattern has been completed, then the robot controller performs the following steps in order: (a) returns the NDI scanner to the location (step 152); (b) sets the state of the finite-state machine to GRID_MOVE; (c) increments the grid location counter; and (d) returns to step 114 in FIG. 11.

After the automated scanning sequence is complete, the individual images from each IRT scan can then be stitched together to produce a single representation of the inspection region.

The above-described system may have many potential use cases for general alignment tasks of robotic manipulators or other devices. One of these use cases is for grid-based NDI scan acquisition in aerospace manufacturing and maintenance environments, e.g., grid-based scanning of an airplane fuselage.

During typical operation, this system can be driven (teleoperated) by a user to an approximate first location, after which it is set to automatically acquire grid scans arranged in an operator-defined vertical and horizontal pattern along either side of the airplane fuselage, as shown in FIG. 10.

The automated grid scanning feature of the motion control algorithm involves feedback of distance data from three laser range meters 236, 238 and 240 to the motion control algorithm, which sets the horizontal and vertical placement, as well as the yaw and pitch orientation of the platform 204 and end effector 224, respectively. This approach eliminates the need for individual pre-defined motion paths for the system, which simplifies usage and reduces setup time.

The system can also be fully controlled in a teleoperation mode to allow operators to acquire data manually. A semi-automated mode is also possible, where the system operator controls the platform location and mast height, and the system automatically adapts the end effector pitch orientation to maintain a perpendicular alignment with the surface in front of it.

Figure 12:
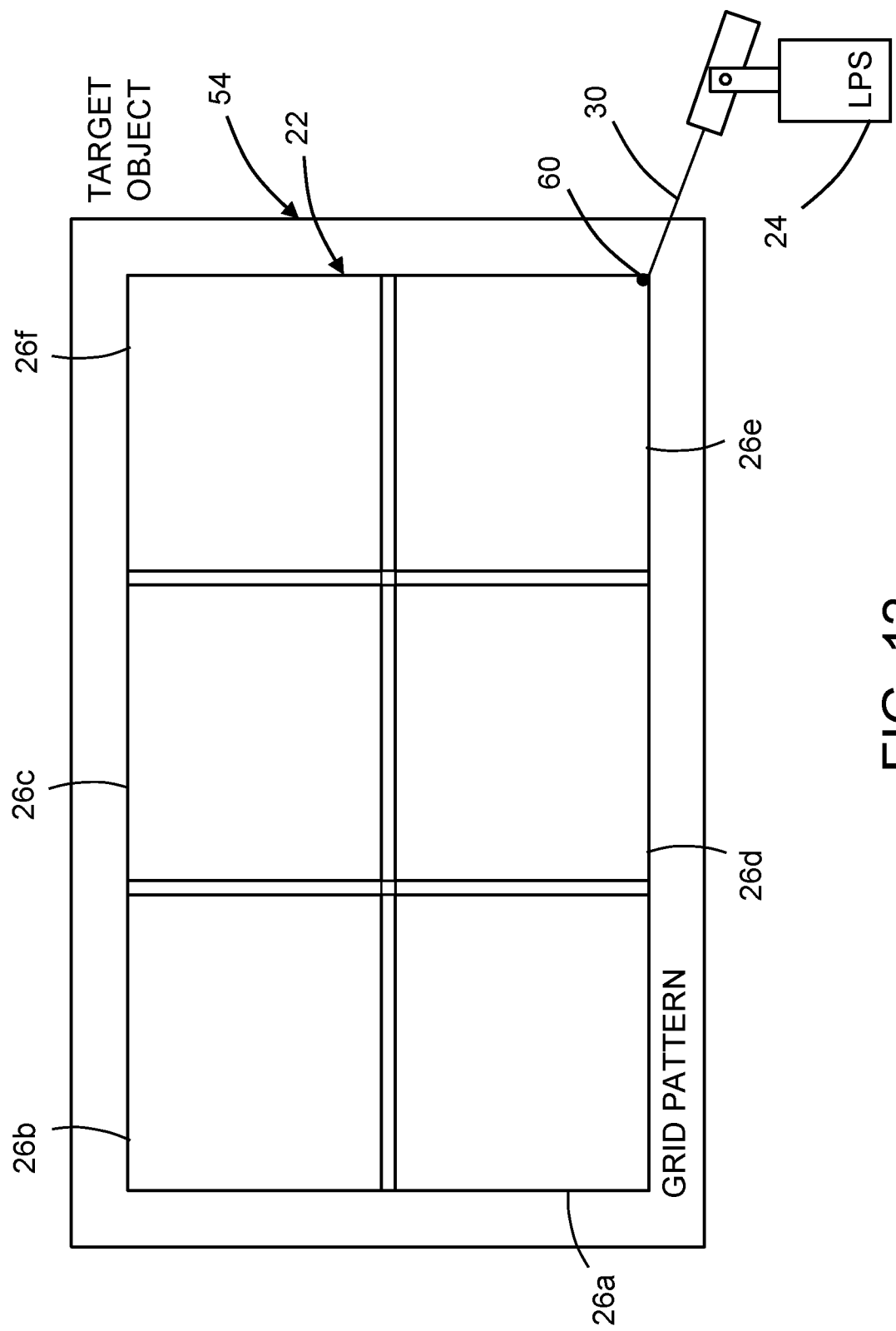
FIG. 12 is a diagram representing measurement of a scan region boundary using a local positioning system (LPS).

In order to correctly locate the scans in the coordinate system of an airplane, 3-D coordinate position measurements are taken of the boundary regions of the scans. This boundary reference allows the combined scan image to be placed in the same coordinate system as the target object and its associated CAD models. This enables association of acquired scans with the respective 3-D models of the target object, as well as providing location data for future reference. For this system, a local positioning system (LPS) 24 (shown in FIG. 12) is used to acquire 3-D coordinate position data in the coordinate system of the target object 54. For example, FIG. 12 shows the LPS 24 directing a laser beam 30 at a measured boundary position 60. Assuming that the LPS 24 has already been calibrated with respect to the coordinate system of the target object 54, the boundary position data points acquired by the LPS 24 can be used to determine the coordinates of each boundary position in the coordinate system of the target object 54.

In accordance with one embodiment, acquisition of the boundaries of a scan can be accomplished by targeting the corners of the IRT shroud 216 when the IRT scanner 214 (see FIGS. 5 and 8) is capturing the scan data for specific locations. These LPS boundary measurements are performed before the first scan and after the last scan, or at any intermediate location in the grid sequence. In accordance with one proposed implementation, the corners (or some known locations) on the IRT shroud 216 can have either active (e.g., LEDs) or passive optical targets or other visible features. The passive approach requires that the system operator run the LPS 24 to target the points; the use of active LED targets enables an automated approach using the LPS camera to detect the LEDs. Ideally it would be best to get all four corners of the scanned region, but the IRT shroud 216 sometimes occludes the optical targets, which makes them hard to target. The minimum number of optical targets needed for this part of the process is two, since one can make assumptions about the shape of the X by Y scanned region, for example, using surface normals from a 3-D CAD model of the target object.

Figure 13:
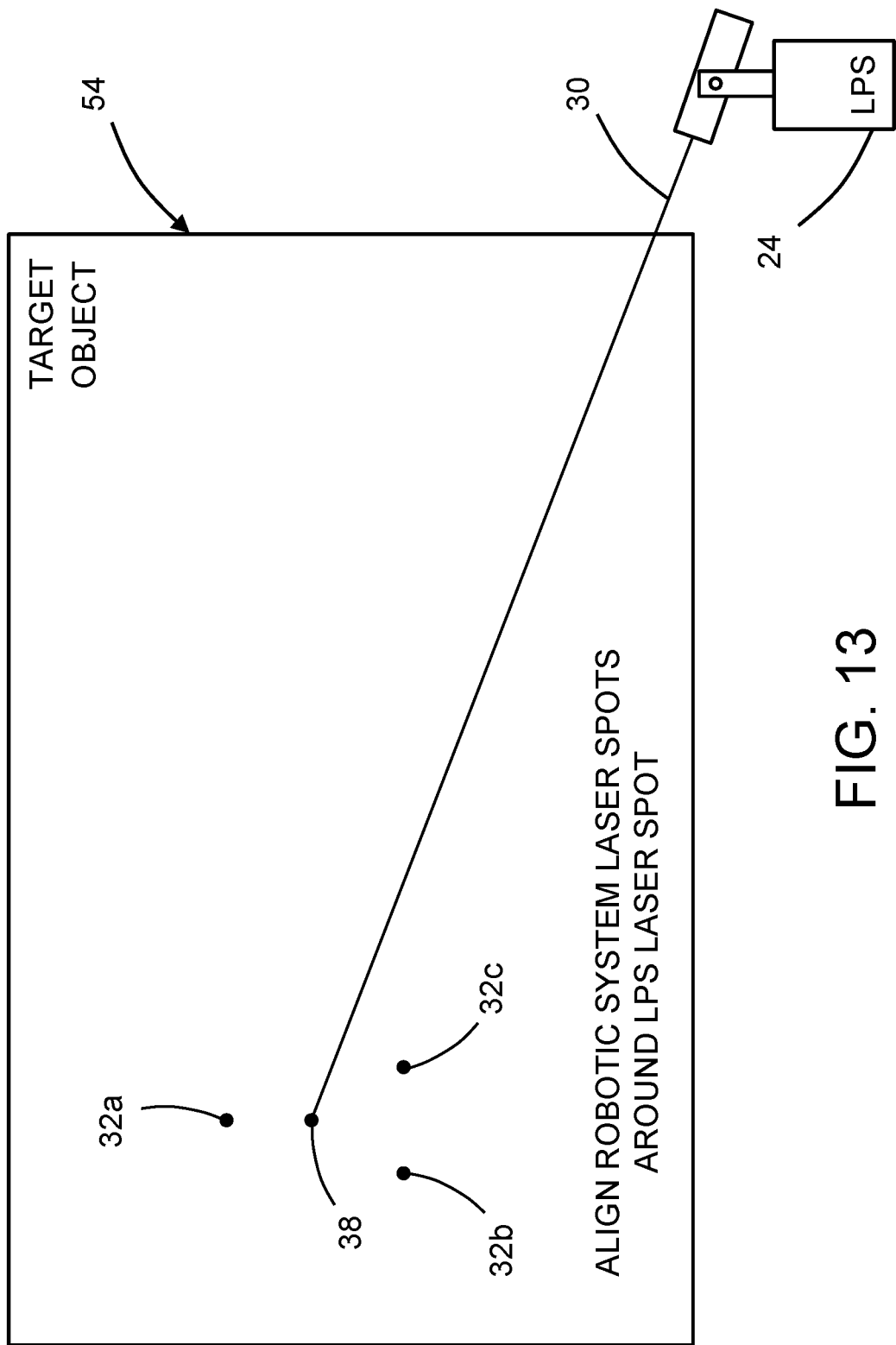
FIG. 13 is a diagram representing initial location alignment of the robotic system using the LPS.

The motorized pan-tilt control aspects of the LPS 24 allow it to also provide an initial location reference and guidance capability to indicate a desired first location for scans. After an initial calibration of the LPS 24 to known locations on the target object, the operator can instruct the LPS 24 to aim its laser pointer at a specified 3-D coordinate on the target surface, which laser spot 38 is indicated in FIG. 13. The operator then drives the robot to align the laser spots 32$a$, 32$b$ and 32$c$ of its laser range meters 236, 238 and 240 respectively around the LPS laser spot 38, as shown in FIG. 13.

In order to use the LPS 24 to acquire measurements in the coordinate system of the target object 54 (e.g., an airplane), the system operator uses three known points on the target object. These three points are calibration points, which are separate from the points on the IRT shroud 216 that are measured for the scan registration process. This means that if one wants to align the scan data with the airplane coordinates, the total minimum number of LPS measurements is five: three for the initial LPS calibration and two to define the rectangular region in which the scan took place.

Figure 14:
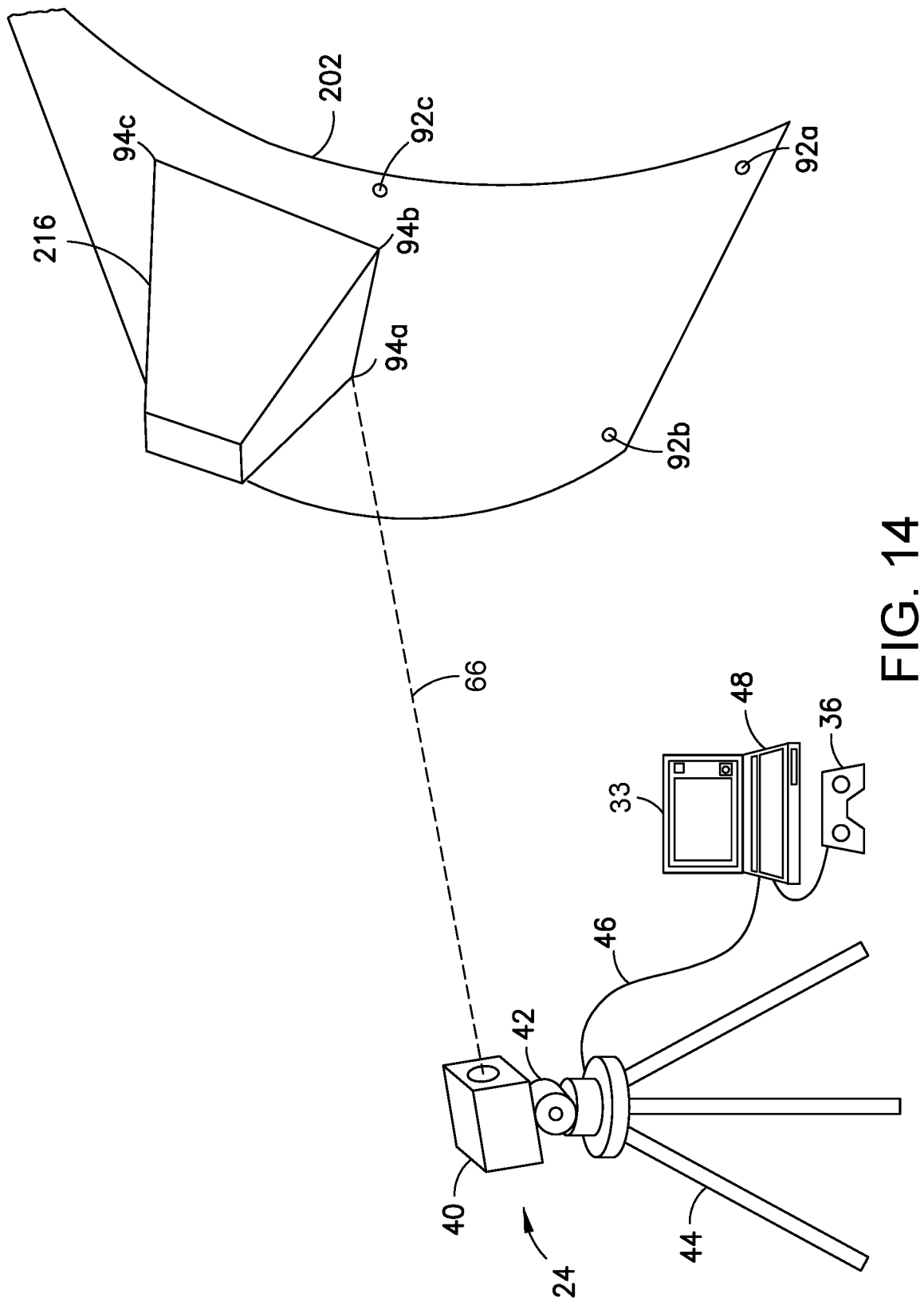
FIG. 14 is diagram representing a perspective view of the LPS executing a robot-to-part localization process in accordance with one embodiment.

FIG. 14 is a perspective view of a system capable of executing a robot-to-target localization process in accordance with one embodiment. The robot-to-target localization process is performed using an LPS 24 comprising a single camera 40 and a laser range meter (not shown) on a controllable pan-tilt unit 42. The LPS operation and calibration process is disclosed in U.S. Pat. No. 7,859,655, the disclosure of which is incorporated by reference herein in its entirety.

More specifically, the local positioning system depicted in FIG. 14 comprises a video camera 40 which may have automated (remotely controlled) zoom capabilities. The video camera 40 is supported on a pan-tilt mechanism 42. The video camera 40 and the pan-tilt mechanism 42 may be operated by an LPS control computer 48. The LPS control computer 48 communicates with the video camera 40 and the pan-tilt mechanism 42 through a video/control cable 46. Alternatively, the LPS control computer 48 may communicate with video camera 40 and pan-tilt mechanism 42 through a wireless communication pathway (not shown). The LPS control computer 48 is configured to control the operation of the LPS hardware, including the laser range meter (not shown), the video camera 40 and the pan-tilt mechanism 42. For example, the pan and tilt angles of the pan-tilt mechanism 42 and, therefore, the orientation of the video camera 40 can be controlled using the keyboard of computer 48 or other user interface hardware 36 (e.g., a gamepad). The optical image field, as sighted by the video camera 40, can be displayed on the monitor 33 of LPS control computer 48.

The pan-tilt mechanism 42 is controlled to rotationally adjust the laser range meter (not shown) and the video camera 40 to selected angles around a vertical, azimuth (pan) axis and a horizontal, elevation (tilt) axis. A direction vector 66 (indicated by a dashed line in FIG. 14), that describes the orientation of the laser range meter (not shown) and video camera 40 relative to the fixed coordinate system of the tripod 44 (or other platform on which the pan-tilt unit is attached), is determined from the pan and tilt angles when the camera is aimed at a point of interest. In FIG. 14, the direction vector 66 extends from the laser range meter (not shown) and video camera 40 and intersects a point 94$a$ on one corner of the shroud 216.

A laser range meter may be incorporated inside the housing of camera 40 or mounted to the outside of camera 40 in such a way that it transmits a laser beam along the direction vector 66. The laser range meter is configured to measure the distance to any visible feature (e.g., one of the corners 94$a$-$c$) on the shroud 216 or the distance to any calibration point (e.g., points 92$a$-$c$) on the curved workpiece 202. (Each calibration point may be a visible feature on the curved workpiece 202 or an optical target attached to the curved workpiece 202.) The laser range meter may have a laser and a unit configured to compute distances based on the laser light detected in response to a laser beam reflected from the point of impingement.

The local positioning system shown in FIG. 14 further comprises three-dimensional localization software which is loaded into LPS control computer 48. For example, the three-dimensional localization software may be of a type that uses multiple calibration points 92$a$-$c$ on the curved workpiece 202 to define the location (position and orientation) of video camera 40 relative to curved workpiece 202. The calibration points 92$a$-$c$ may be visible features of known position in the local coordinate system of the curved workpiece 202 as determined from a three-dimensional database of feature positions (e.g., a CAD model) or other measurement technique. During the LPS calibration process, X, Y, Z data for at least three non-collinear points are extracted from the CAD model. Typically calibration points are selected which correspond to features that can be easily located on the target object. The three-dimensional localization software utilizes the X, Y, Z data of the calibration points 92$a$-$c$ and the pan and tilt data from the pan-tilt mechanism 42 to define the relative position and orientation of the video camera 40 with respect to the local coordinate system of the curved workpiece 202. The measured distances to the calibration points 92$a$-$c$ may be used in coordination with the pan and tilt angles from the pan-tilt mechanism 42 to solve for the camera position and orientation relative to the curved workpiece 202. A method for generating an instrument-to-target calibration transformation matrix (sometimes referred to as the camera pose) is disclosed in U.S. Pat. No. 7,859,655. Using the known and measured data, the calibration process computes the 4×4 homogeneous transformation matrix that defines the position and orientation of the video camera 40 relative to the curved workpiece 202.

Once the position and orientation of the video camera 40 with respect to the curved workpiece 202 have been determined and a camera pose transformation matrix has been generated, camera pan data (angle of rotation of the video camera 40 about the azimuth axis) and tilt data (angle of rotation of the video camera 40 about the elevation axis) may be used in conjunction with the calculated position and orientation of the video camera 40 to determine the X, Y and Z coordinates of any point of interest on the shroud 216 in the coordinate system of the curved workpiece 202. By locating the shroud 216 at the beginning and at the end of the scan pattern, the location of the scan pattern in the coordinate system of the curved workpiece 202 can be determined.

More specifically, a relative localization process can be used to determine the location of a visible feature of the shroud 216 (e.g., any one of the corners 94a-c depicted in FIG. 14) in the coordinate system of the curved workpiece 202 at the beginning and end of the scan pattern. The basic process sequence as applied to the shroud 216 is as follows: (1) The local positioning system calibrates to the coordinate system of the target object being inspected (e.g., curved workpiece 202) by measuring three known points 92a-c on the target object. (2) The local positioning system measures the location of a visible feature (e.g., corner 94a) on the shroud 216 when the robot is at the beginning of the scan pattern (e.g., for scan area 26a seen in FIG. 12). (3) Later the local positioning system is used to measure the location of the same visible feature or a different visible feature (e.g., corner 94b or 94c) on the shroud 216 when the robot is at the end of the scan pattern (e.g., for scan area 26f seen in FIG. 12). (4) This allows the operator to determine the boundaries of the scans making up the mosaic pattern.

The LPS control software running in computer 48 computes the location of each visible feature on the shroud 216 relative to the coordinate system of the curved workpiece 202. The LPS control computer 48 (see FIG. 14) sends the location data to the expert workstation 74 depicted in FIG. 17, which is configured to record the location coordinates for future reference. This location data may also be used to align the scan data with a CAD model of the target object.

The LPS control software on computer 48 outputs the point data as X, Y and Z values, but control applications use more than just X, Y and Z data points to provide the position and orientation of the curved workpiece 202. To solve the position and orientation problem, the X, Y and Z data from the three measured points 92a-c and the known dimensions of these points are used to compute the full 6-degrees-of-freedom position and orientation representation. This is what the previously described localization software does. The position and orientation format that the localization software uses is a 4×4 transformation matrix, but there are other ways to represent the data.

If the system operator wishes to perform a relative LPS scan (as described in U.S. Patent Application Publ. No. 2015/0268033), then the operator can use any three non-collinear points on the target object, but does not need to know the 3-D coordinates for those points beforehand (as one does with the standard LPS method). The system operator will not obtain the results in target object coordinates with the relative mode, but for some applications that is not needed. The relative LPS localization process can be used to ensure that the NDI sensor is aligned in the same region as was the situation earlier. It is also useful for piecing together several separate scans or if it was necessary to move the LPS.

As previously disclosed, the system uses distance measurement devices, such as lasers, string encoders, ultrasonic sensors, with the basic requirement being at least three non-collinear distance measurement devices. One distance sensor configuration (described above) uses three distance measurement lasers arranged in triangular formation. In an alternative embodiment, four distance measurement lasers are arranged in rectangular formation. Regardless of which sensor configuration is used, the distance data is fed to the robot controller 80, along with end effector orientation data. Feedback control methods can be used to drive to zero the error between the current angle and the desired angle.

Figure 15B:
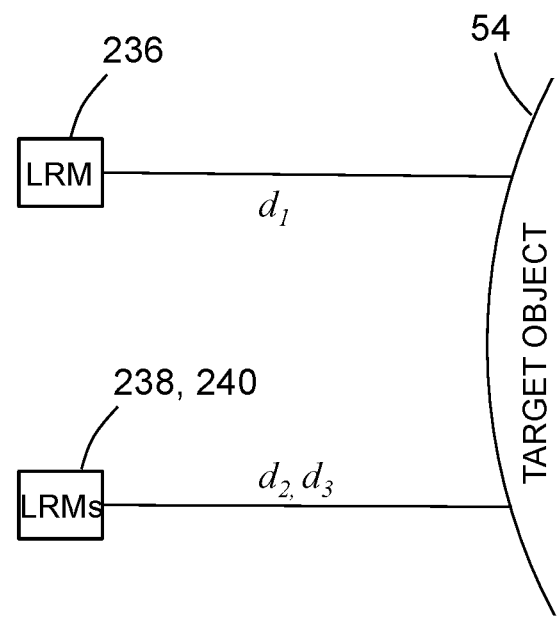
Figure 15C:
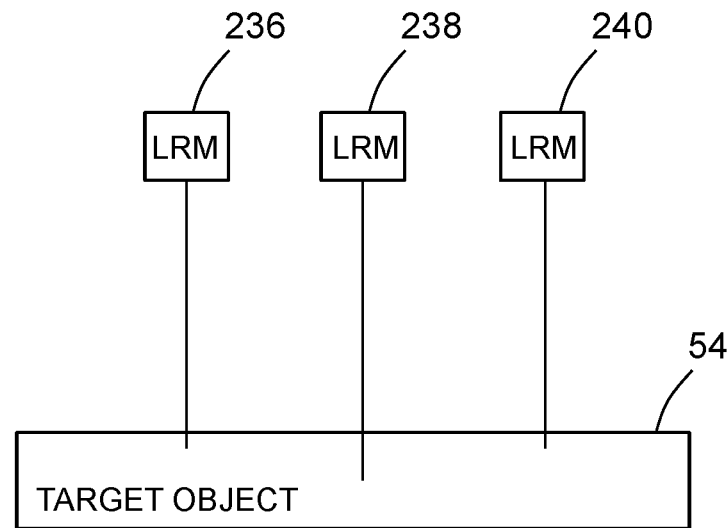

A method for determining angles using laser range meters will now be described with reference to FIGS. 15A-15C. FIGS. 15A through 15C are diagrams representing front, side and top views respectively of three laser range meters 236, 238 and 240 arranged in a triangular pattern in a common plane and directed at respective spots on a surface of a target object 54, the laser range meters and spots being separated by respective distances.

In addition to using the three lasers to determine distance to the target, they are also used to determine the yaw and pitch angles. FIG. 15A shows positions of the laser range meters 236, 238 and 240 relative to each other using a horizontal dimension a and a vertical dimension b, along with measured distances $d_1$, $d_2$, and $d_3$ to the surface of the target object 54 Equations (1) and (2) can be used to calculate the pitch and yaw angles:

$$\text{PitchAngle} = a\tan 2(d_1-(d_2+d_3)/2, b) \quad (1)$$

$$\text{YawAngle} = a\tan 2(d_2-d_3, a) \quad (2)$$

where PitchAngle and YawAngle are the current computed angles for the alignment apparatus shown in FIGS. 15A-15C relative to the surface of the target object 54. The goal for these angles, which are measured relative to the surface normal at the current location, is to be equal to zero; and the process to achieve the goal angles is described below.

With the current yaw and pitch angles calculated, the system motion controller can use a velocity control method for the controlled motions: pan, tilt, and distance. A feedback controller, such as a proportional-integral-derivative (PID) controller, can be used to drive to zero the error between the current angle and the desired angle. Equations (3) and (4) can be used to compute the pitch and yaw motion control:

$$\text{PitchRate} = Kp_{pitch} * (\text{PitchAngle} - \text{PitchAngle}_{goal}) \quad (3)$$

$$\text{YawRate} = Kp_{yaw} * (\text{YawAngle} - \text{YawAngle}_{goal}) \quad (4)$$

where PitchRate and YawRate describe the angular rotation rates about the pitch axis of the alignment apparatus and yaw axis of the base, respectively; $Kp_{pitch}$ and $Kp_{yaw}$ are the proportional feedback gains associated with the pitch and yaw axes, respectively; PitchAngle and YawAngle are the angles computed from Eqs. (1) and (2), respectively; and $\text{PitchAngle}_{goal}$ and $\text{YawAngle}_{goal}$ are the desired goal angles to which the controller is driving the system toward (as mentioned earlier, these are both zero for this example). Integral and derivative feedback may also be used, but are not shown here.

The base velocity equations are as follows:

$$\text{Vel}_x = Kp_x * (\text{MinDist}_x - \text{offset}_x) \quad (5)$$

$$\text{Vel}_y = Kp_y * (\text{MinDist}_y - \text{offset}_y) \quad (6)$$

where $Vel_x$ and $Vel_y$ are the lateral velocities of the base; $Kp_x$ and $Kp_y$ are the proportional feedback gains for the X and Y directions of the base, respectively; $MinDist_x$ and $MinDist_y$ are the smallest values measured by the lasers in the X and Y directions, respectively; and $offset_x$ and $offset_y$ are the goal offset distances. For some applications, the lasers are not configured to measure in both X and Y directions; in those cases the X or Y velocity control equations associated with the alignment process would not be used.

Figure 16:
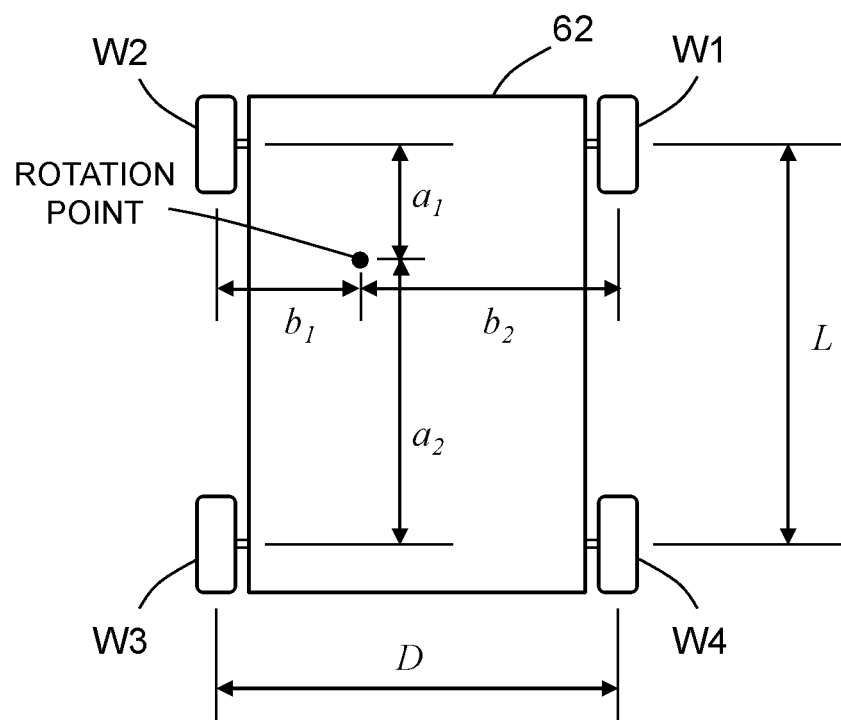
FIG. 16 is a diagram representing a top view of a holonomic-motion base platform having four Mecanum wheels with various dimensions indicated by double-headed arrows.

For a holonomic-motion base platform that comprises a base frame 62, one pair of Type A Mecanum wheels W1 and W3 along one diagonal and one pair of Type B Mecanum wheels W2 and W4 along the other diagonal, kinematics can be used to compute the four individual wheel velocities. The dimensions of the vehicle (L and D) and desired rotation point (described by the distances $a_1$, $a_2$, $b_1$, $b_2$) are shown in FIG. 16. The individual wheel velocities for wheels W1 through W4 are shown in Eqs. (7) through (10):

$$V_{W1} = Vel_y - Vel_x + YawRate*(a_1+b_1) \quad (7)$$

$$V_{W2} = Vel_y + Vel_x - YawRate*(a_1+b_2) \quad (8)$$

$$V_{W3} = Vel_y - Vel_x - YawRate*(a_2+b_2) \quad (9)$$

$$V_{W4} = Vel_y + Vel_x + YawRate*(a_2+b_1) \quad (10)$$

where $V_{Wi}$ (for i=1, 2, 3, 4) are individual wheel velocities; $Vel_x$ and $Vel_y$ are the lateral velocities from Eqs. (5) and (6); YawRate is the yaw rotation rate from Eq. (4); and $a_1$, $a_2$, $b_1$, $b_2$ are the rotation point distances as shown in FIG. 16.

The primary pivot configurations for the end effector are the following: (a) one-axis pivot: one motor, one angle sensor; and (b) two-axis gimbal: two motors, two angle sensors.

The above-described alignment process addresses both discrete and continuous sensor update use cases, and the concept can also be packed as a stand-alone system or part of an existing system.

Although the concepts disclosed herein have application for holonomic-motion base platforms, variations are also applicable to other systems. Potential use cases include: holonomic and non-holonomic platforms; articulated robotic arms; gantry arms; hybrid motion-base/arm systems; helicopters and UAVs; cameras; lights; and tools.

The laser-based alignment process disclosed herein enables the system to be operated without having to teach the robot on-line or preprogram it off-line, which makes this approach easier to use. This guides the end effector into place while adapting to unexpected changes in the environment. Instead of playing through a list or pre-programmed motion steps, the system operates as a finite-state machine using feedback from sensors to transition between the various steps in the alignment, grid-based motion, and scanning process.

The alignment sensors also provide collision avoidance ability for the end effector. The configuration of the system allows it to reach areas on the fuselage all the way up to the crown (top) from a ground-based holonomic platform. The solution provides an optional process for collecting location reference data using an external measurement system (LPS).

The ability to collect location data defined in the coordinate system of the target object (e.g., an airplane) allows accurate registration of the scan data with CAD data for maintenance/repair use, as well as a way to record location information for archival purposes.

The configuration of the system using a vertical extension arm with a rotating wrist and modular tool mount, in addition to the alignment sensor elements, provides a compact and relatively low-cost platform that can reach required areas around the fuselage with a minimal ground footprint.

The system disclosed herein can be configured to accept various types of NDI devices mounted to its end effector, including: eddy current, ultrasonic, and infrared thermography (IRT) sensors. A vertical support mast with a pivoting end effector on an extension arm allows full height inspection of an airplane fuselage section. The holonomic-motion base allows efficient re-positioning of the sensor unit along the length of the fuselage. Motion control software enables automatic capture overlapping grid pattern scans. Reference position data is captured for scan alignment with airplane coordinates.

During operation, this system can be driven (teleoperated) by an operator to get it into the general location of the starting region, and is then configured to automatically acquire grid scans arranged in an operator-defined vertical and horizontal pattern along either side of the airplane fuselage. One of the features of the motion control algorithm used here is that it involves distance sensor feedback instead of requiring individual pre-defined motion paths for the system, which simplifies usage and reduces setup time. In order to correctly locate the scans in the coordinate system of the airplane, 3-D coordinate position measurements are taken of the boundary regions of the scans. A local positioning system is used to acquire 3-D coordinate position data in the coordinate system of the airplane. This reference position data is then used to align the NDI scans with the appropriate airplane coordinate system.

Figure 17:
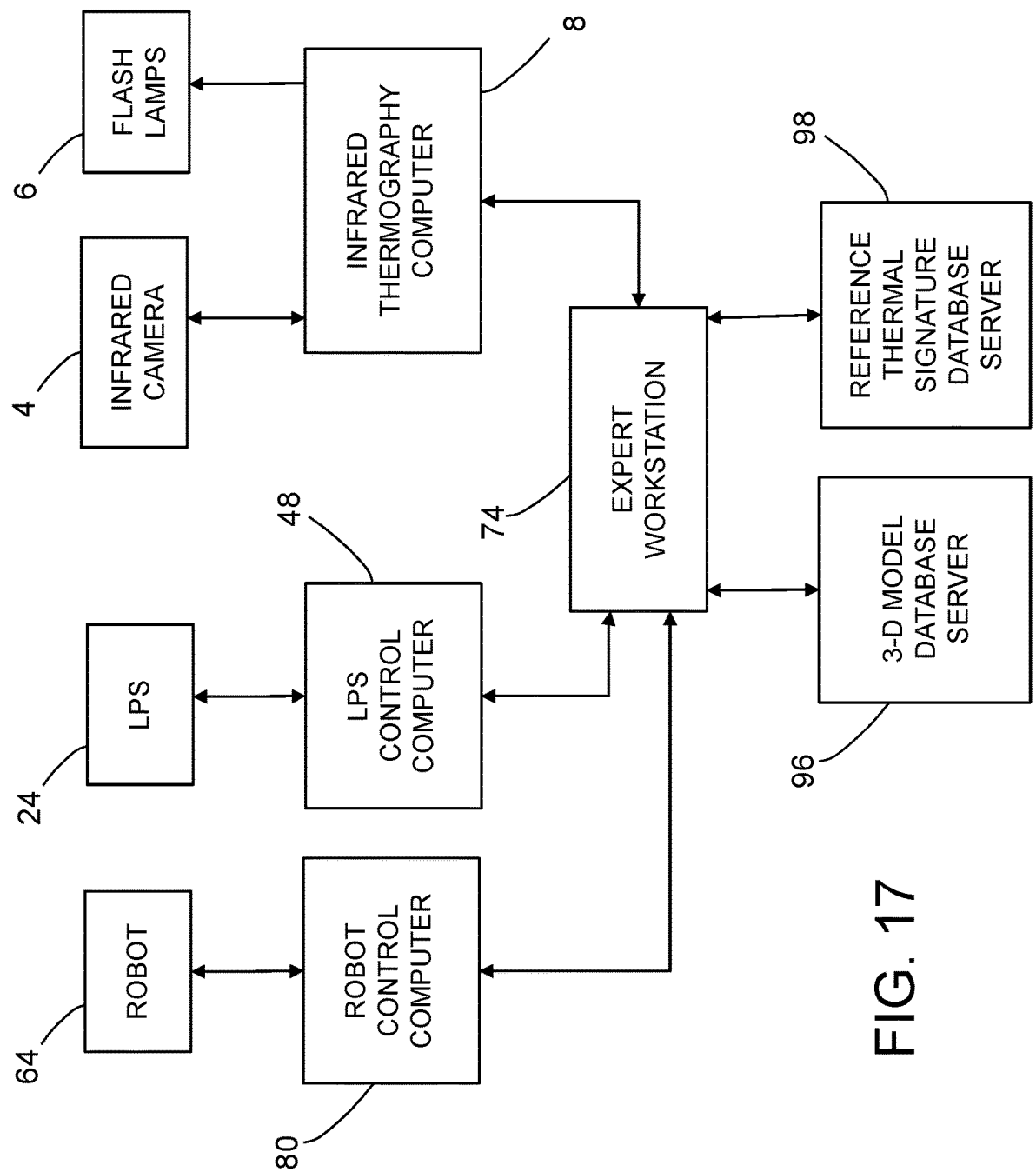
FIG. 17 is a block diagram identifying some components of a system for infrared thermographic inspection of large composite structures in accordance with some embodiments.

FIG. 17 is a block diagram identifying some components of a system for infrared thermographic inspection of large-scale composite structures in accordance with one computer architecture. Movements of a robot 64 are controlled by a robot controller 80 based on a finite-state machine and feedback from at least distance sensors (e.g., three laser range meters). Movements and firing of the LPS 24 are controlled by an LPS control computer 48, which also receives laser tracking data from the LPS 24. Activation of the infrared camera 4 and flash lamps 6 are controlled by an infrared thermography computer 8, which also receives infrared imaging data from the infrared camera 4. All of these computers can be in wireline or wireless communication with a master computer at an expert workstation 74. The master computer at the expert workstation 74 may be programmed to correlate the laser tracking data with the infrared imaging data. The master computer may be further programmed to request 3-D model data from a 3-D model database server 96. In the case of thermographic porosity measurement, the master computer at the expert workstation 74 may also be programmed to request reference thermal signature data from a reference thermal signature database server 98.

The LPS control computer 48 acquires location data for the infrared camera 4 in a 3-D coordinate system of the composite structure. In the case of a barrel-shaped fuselage section, the infrared imaging data can be mapped directly onto a 3-D model of the fuselage section. The overlay of infrared imaging data with the 3-D model data enables improved data analysis and potential automated data analysis as well. For example, features/flaw indications can be directly correlated to the fuselage structure by direct overlay of infrared imaging data on the 3-D model. In addition, the direct data overlay onto the model can be used to determine the thickness of a local area or spatial point, which is needed for porosity quantification. In one embodiment, the process involves application of infrared imaging data strips as one or more computer graphics texture maps, which are projected onto the 3-D model surfaces in a virtual environment displayed on a monitor or computer screen at the expert workstation 74.

In some applications, the IRT scanner 214 can be employed with the IRT shroud 216 removed. In cases where the shroud is not needed, additional equipment for contact-based NDI (e.g., an ultrasonic transducer array or an eddy current probe) can be attached to the IRT scanner 214. Such embodiments can be enhanced by the provision of means for stabilizing the distal end of the arm of the automated apparatus. In accordance with various embodiments, stabilization is provided by three or more stabilizers each comprising a stationary part and a movable part. Each stationary part has a fixed location relative to an end effector; each movable part is translatably coupled to a respective stationary part and comprises a contactor disposed at a distal end of the movable part. When the stabilizers are actuated, the contactors are translated toward and into contact with the surface of the workpiece and then locked in place to stabilize the distal end of the arm and the end effector coupled thereto. During tool operation, the stabilizers reduce oscillation of the end effector 224 (and all structure fixedly coupled thereto).

Figure 18:
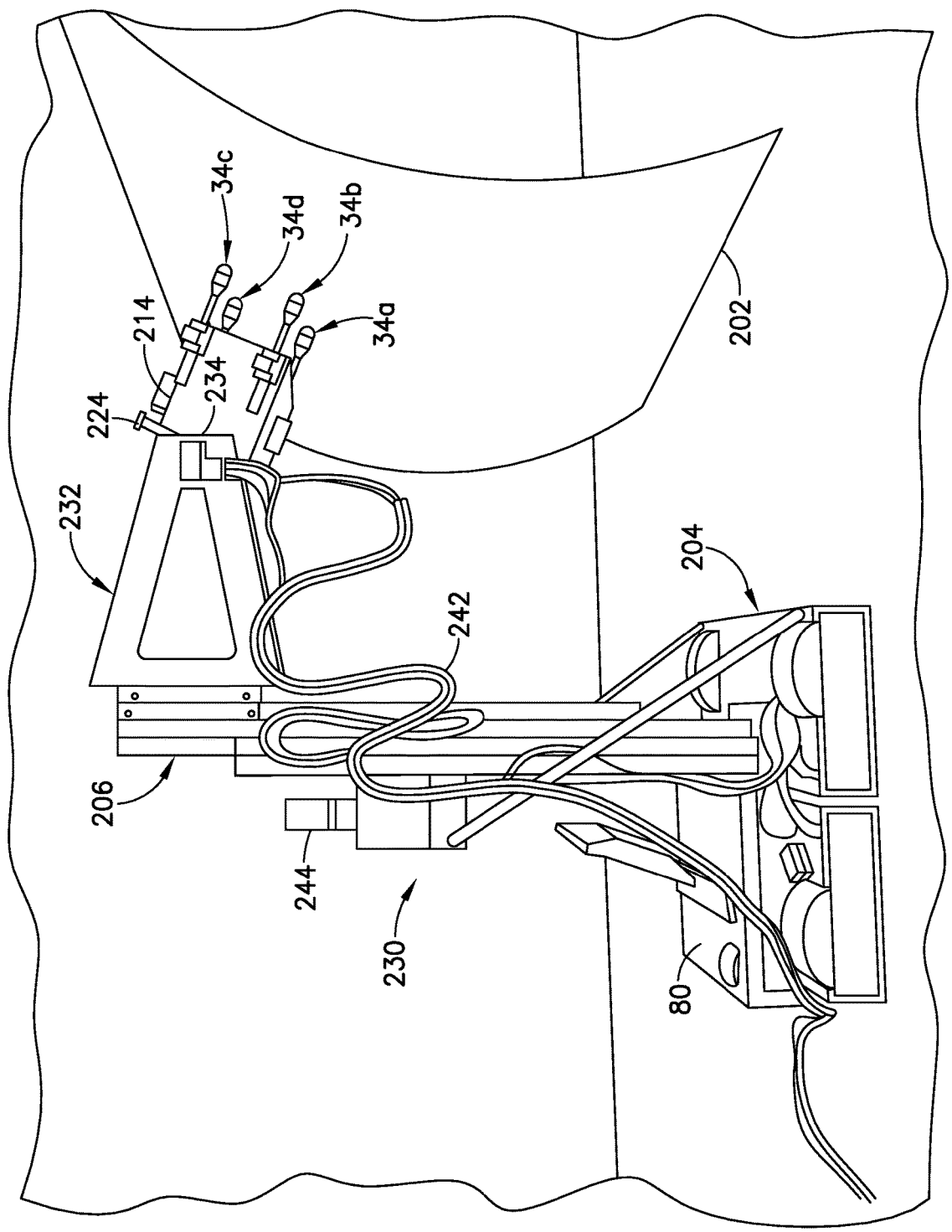
FIG. 18 is a diagram representing a perspective view of a ground-based robotic NDI mobile platform in the process of scanning a curved workpiece using a pneumatically stabilized scanner in accordance with one embodiment.

FIG. 18 is a diagram representing a perspective view of a ground-based robotic NDI mobile platform in the process of scanning a curved workpiece using a pneumatically stabilized IRT scanner 214 in accordance with a further embodiment in which an IRT shroud is not employed. During the scanning operation, the end effector 224 and the IRT scanner 214 mounted thereto are stabilized by four pneumatic stabilizers 34a-34d which contact the surface of the curved workpiece 202 in areas outside the area to be scanned by the IRT scanner 214. However, the number of stabilizers can be three instead of four or some number greater than four. (If only three stabilizers are employed, they should not be collinear or close to collinear, but rather should be located at the vertices of a triangle that bounds the area of interest.) In the embodiment depicted in FIG. 18, each of the pneumatic stabilizers 34a-34d comprises a stationary part that is mounted to the housing of the IRT scanner 214. The structure and operation of the pneumatic stabilizers 34a-34d will be described in some detail later with reference to FIGS. 20 and 23.

Figure 19:
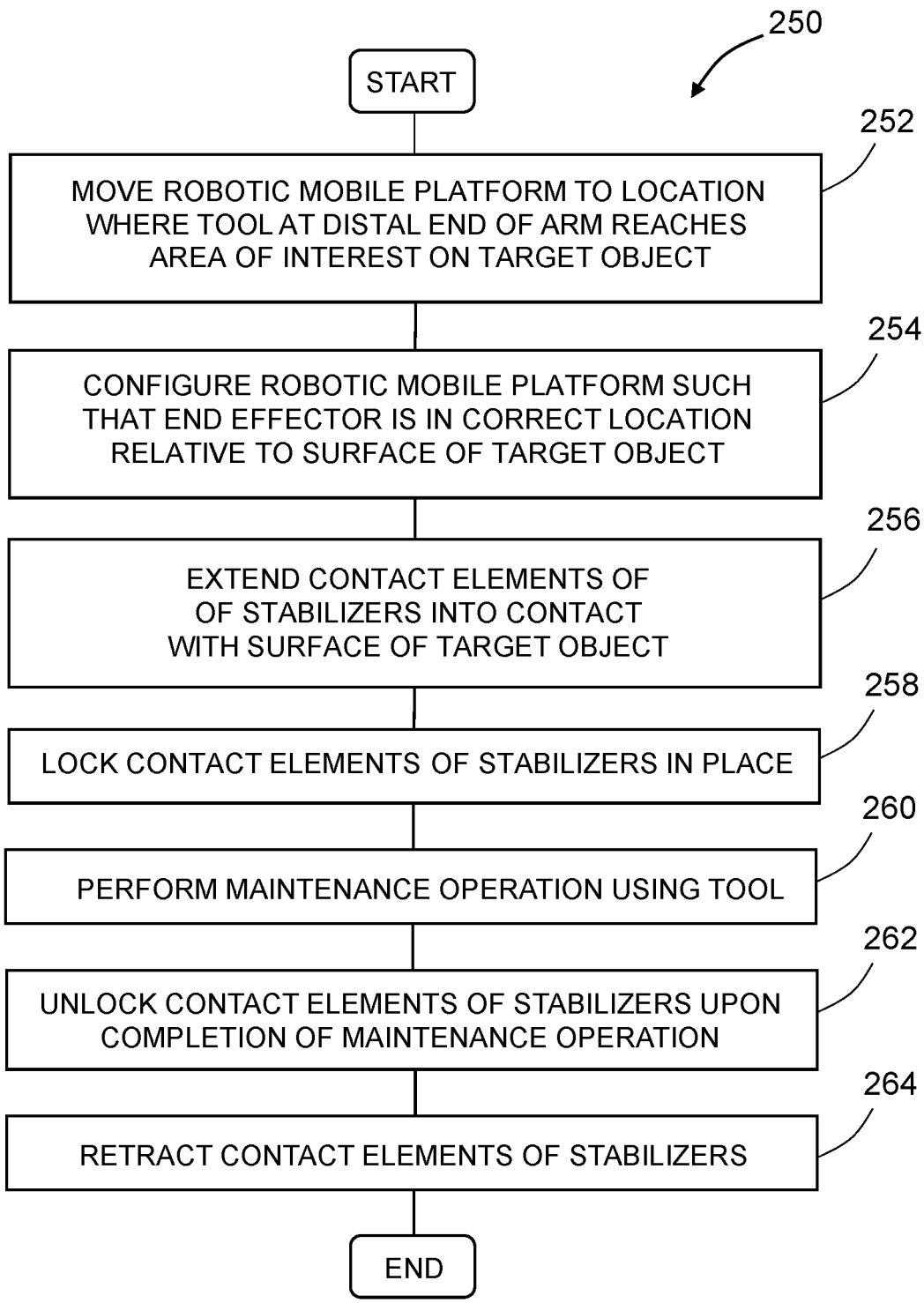
FIG. 19 is a flowchart identifying steps of a method for performing a maintenance operation using a robotic mobile platform equipped with a maintenance tool and a plurality of stabilizers.

FIG. 19 is a flowchart identifying steps of a method 250 for performing a maintenance operation using a robotic mobile platform equipped with a maintenance tool and a plurality of stabilizers. Method 250 comprises the following steps: (a) move a robotic mobile platform to a first location where a tool at a distal end of an arm is able to reach a first area of interest on a surface of a target object (step 252); (b) configure the robotic mobile platform such that an end effector coupled to the distal end of the arm is at a correct location relative to the first area of interest (step 254); (c) extend contactors of a plurality of stabilizers into contact with the surface of the target object, which stabilizers are coupled to the arm (step 256); (d) lock the contactors of the stabilizers in place to maintain the end effector at the correct location relative to the first area of interest (step 258); (e) perform a first maintenance operation using the tool while the end effector is maintained at the correct location relative to the first area of interest (step 260); (f) unlock the contactors of the stabilizers upon completion of the maintenance operation (step 262); and (g) retract the contactors of the stabilizers (step 264).

Although not shown in FIG. 19, the method for performing a maintenance operation may further comprise: (h) moving the robotic mobile platform to a second location where the tool is able to reach a second area of interest on the surface of the target object; (i) configuring the robotic mobile platform such that the end effector is at a correct location relative to the second area of interest; (j) extending contactors of a plurality of stabilizers into contact with the surface of the target object; (k) locking the contactors of the stabilizers in place to maintain the end effector at the correct location relative to the second area of interest; and (l) performing a second maintenance operation using the tool while the end effector is maintained at the correct location relative to the second area of interest. Upon completion of the second maintenance operation, the contactors can be again unlocked and retracted, and the robotic mobile platform can be moved to the next second location.

In accordance with one proposed implementation, the configuring step of method 250 comprises one or both of the following operations: (a) rotating the end effector so that an axis of the end effector is perpendicular to the surface of the target object in the area of interest; and (b) displacing the end effector so that the end effector is separated from the surface of the target object by a goal offset distance. As will be explained in some detail later, a computer system is configured to control various motors on the automated apparatus in dependence on feedback from the laser range meters 236, 238 and 240 to achieve a goal orientation of the end effector relative to the confronting surface of the curved workpiece 202 and a goal offset distance separating the end effector from confronting surface of the curved workpiece 202.

Figure 20:
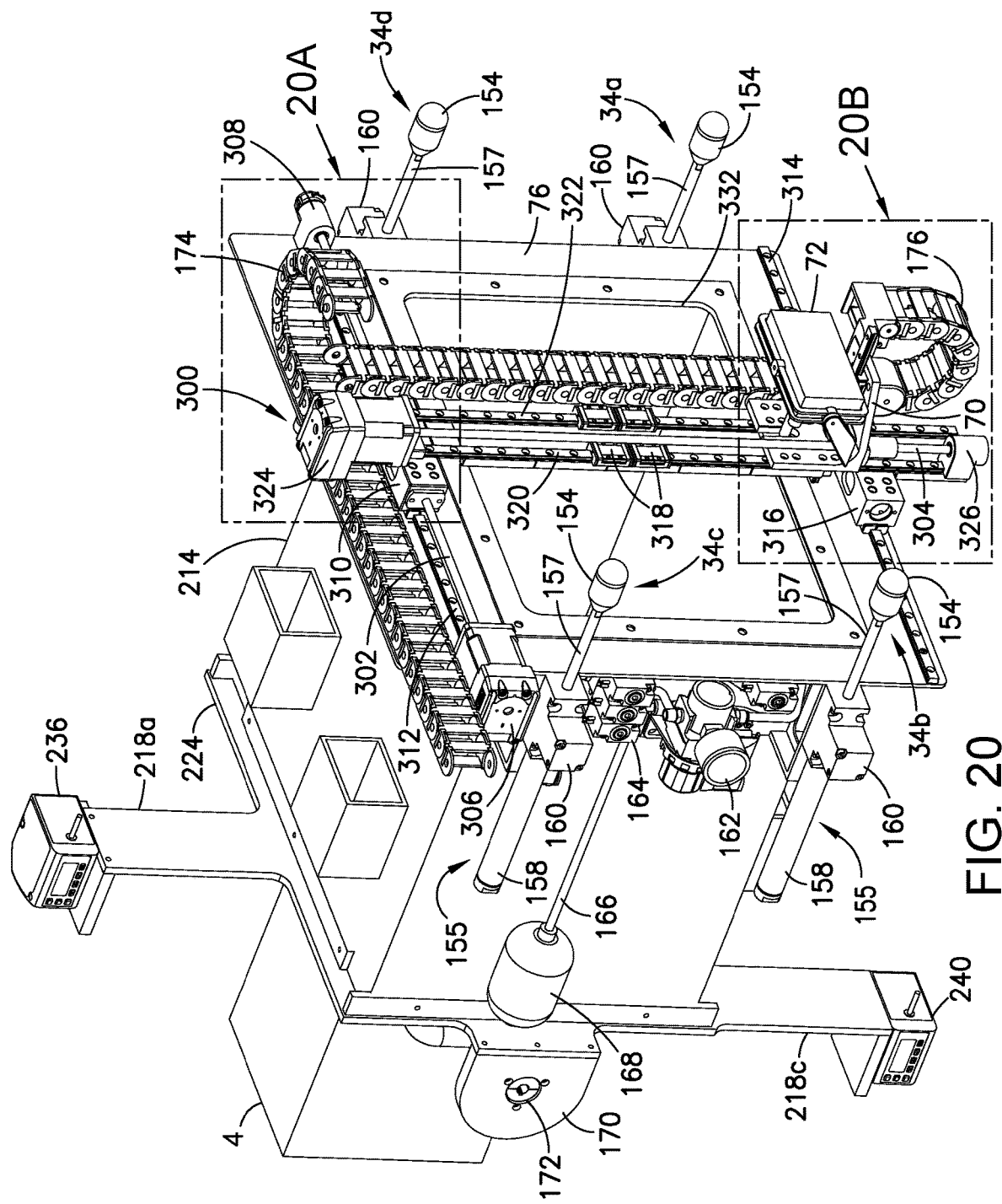
FIG. 20 is a diagram representing a view of a stabilized hybrid tool assembly mounted to an end effector in accordance with an alternative embodiment.
Figure 22:
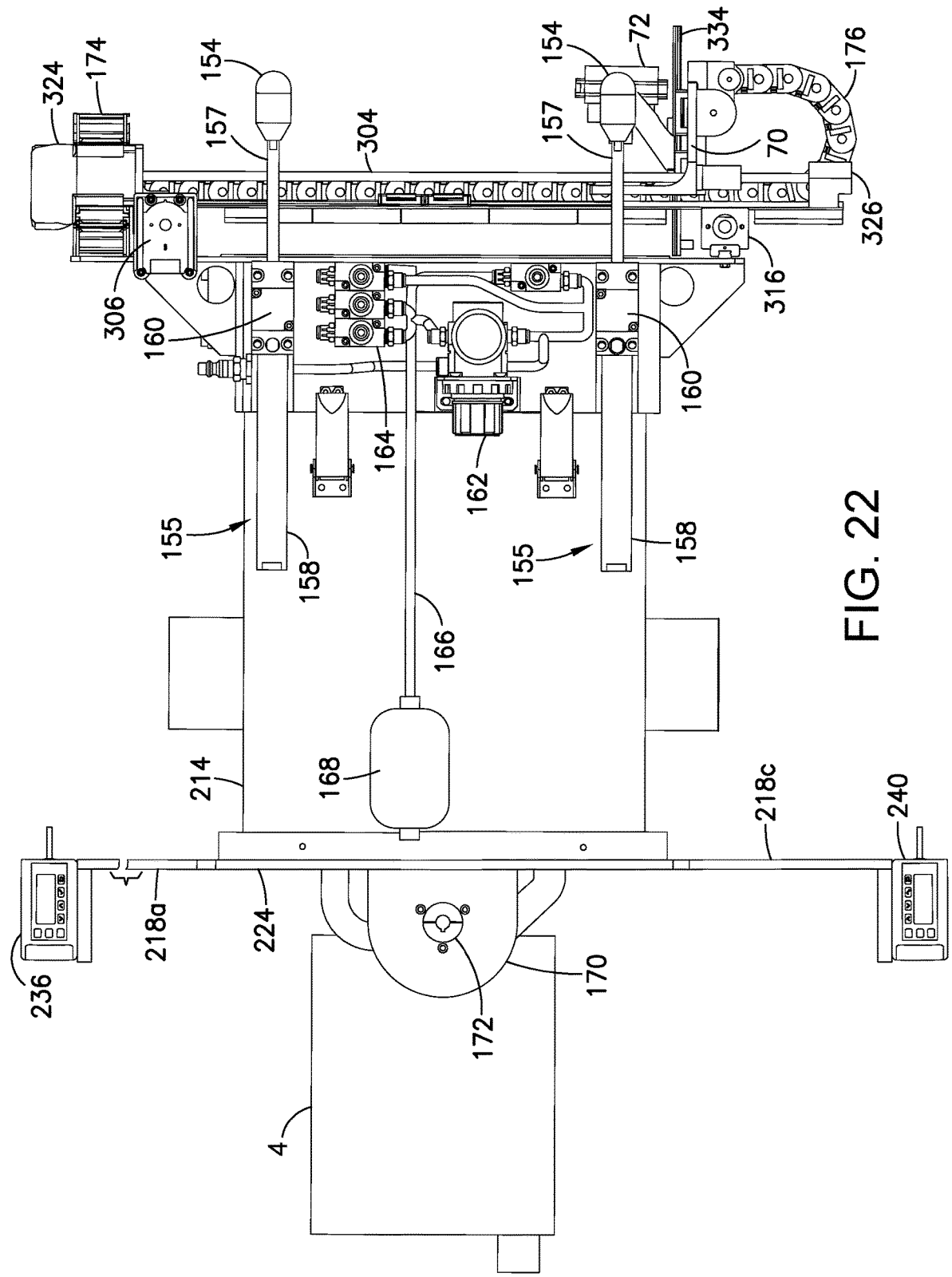

FIG. 20 is a diagram representing a view of a stabilized hybrid tool assembly mounted to an end effector 224 in accordance with an alternative embodiment. FIGS. 21 and 22 are diagrams representing front and side views respectively of the hybrid tool assembly depicted in FIG. 20. In this embodiment, the L-shaped mounting plates 218a-218c (to which the laser range meters 236, 238 and 240 are mounted) are respective links of the end effector 224. The end effector further comprises a pair of D-shaped shaft mounting plates 170 (only one of which is visible in FIG. 20) that support respective shaft couplings 172 (only one of which is visible in FIG. 20) that couple the end effector 224 to a shaft (not shown in the drawings) that is rotatably coupled to the end of the extension arm 232.

As previously described, an IRT scanner 214 can be mounted to the end effector 224, which scanner is therefore pivotable about the axis of the aforementioned shaft. The housing of the IRT scanner 214 includes a window frame 76 having a splash cover attached thereto that forms a window 332 through which the infrared camera 4 can view the area of interest when the robotic NDI mobile platform 200 is being used to perform an IRT inspection.

The hybrid tool assembly depicted in FIG. 22 further comprises an ultrasonic transducer array 72 which is movably coupled to the IRT scanner 214 by means of an array support assembly. The IRT shroud 216 (see FIGS. 4 and 5) is an enhancement to the base IRT system to allow it to take longer-range images, but the IRT scanner 214 can still be used to take shorter-range images without the shroud. As will be explained in some detail below, the elements of the array support assembly that might block the view of the infrared camera inside the IRT scanner can be moved to one side out of the way when the IRT scanner 214 is being used As seen in FIG. 20, the array support assembly comprises a traveling bridge 300 that rides on a pair of mutually parallel horizontal linear rails 312 and 314 attached to the front face of window frame 76. The traveling bridge is slidably coupled to the horizontal linear rails 312 and 314 by means of respective sliders embedded in block connectors 310 and 316. The traveling bridge 300 comprises a pair of mutually parallel vertical linear rails 320 and 322 disposed perpendicular to the horizontal linear rails 312 and 314. The vertical linear rails 320 and 322 are attached to the block connectors 310 and 316. In addition, a carriage 70 is slidably coupled to the vertical linear rails 320 and 322 by means of sliders 318 (which are shown at a middle position along vertical linear rails 320, 322 in FIG. 20 with the carriage removed). In accordance with one proposed implementation, the slider/linear rail assemblies are caged-ball linear motion guides of a type which are commercially available from THK Co. Ltd., Tokyo, Japan.

Figure 20A:
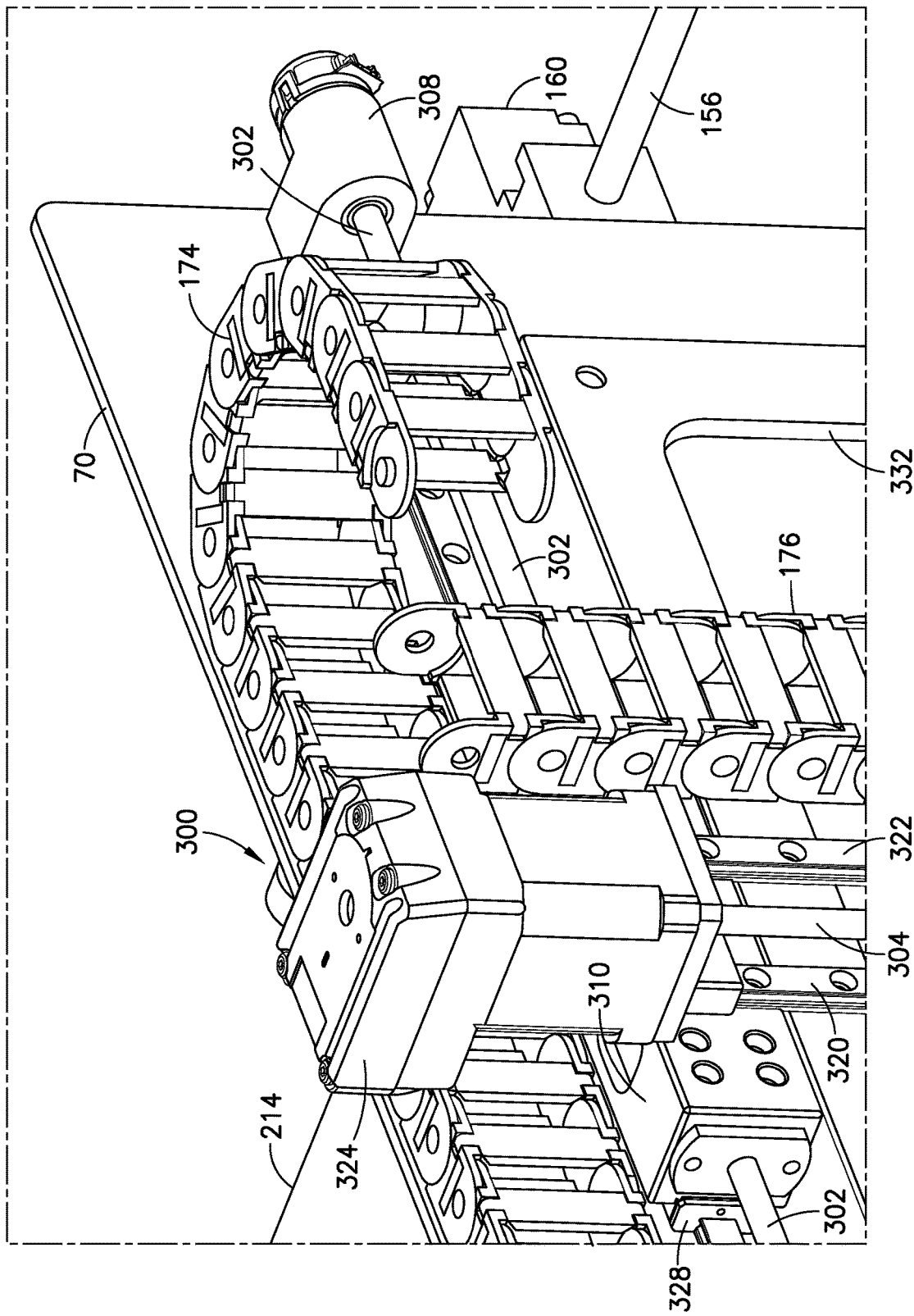
FIGS. 20A and 20B are diagrams representing magnified views of respective portions of the hybrid tool assembly within the respective dashed rectangles 20A and 20B seen in FIG. 20.
Figure 20B:
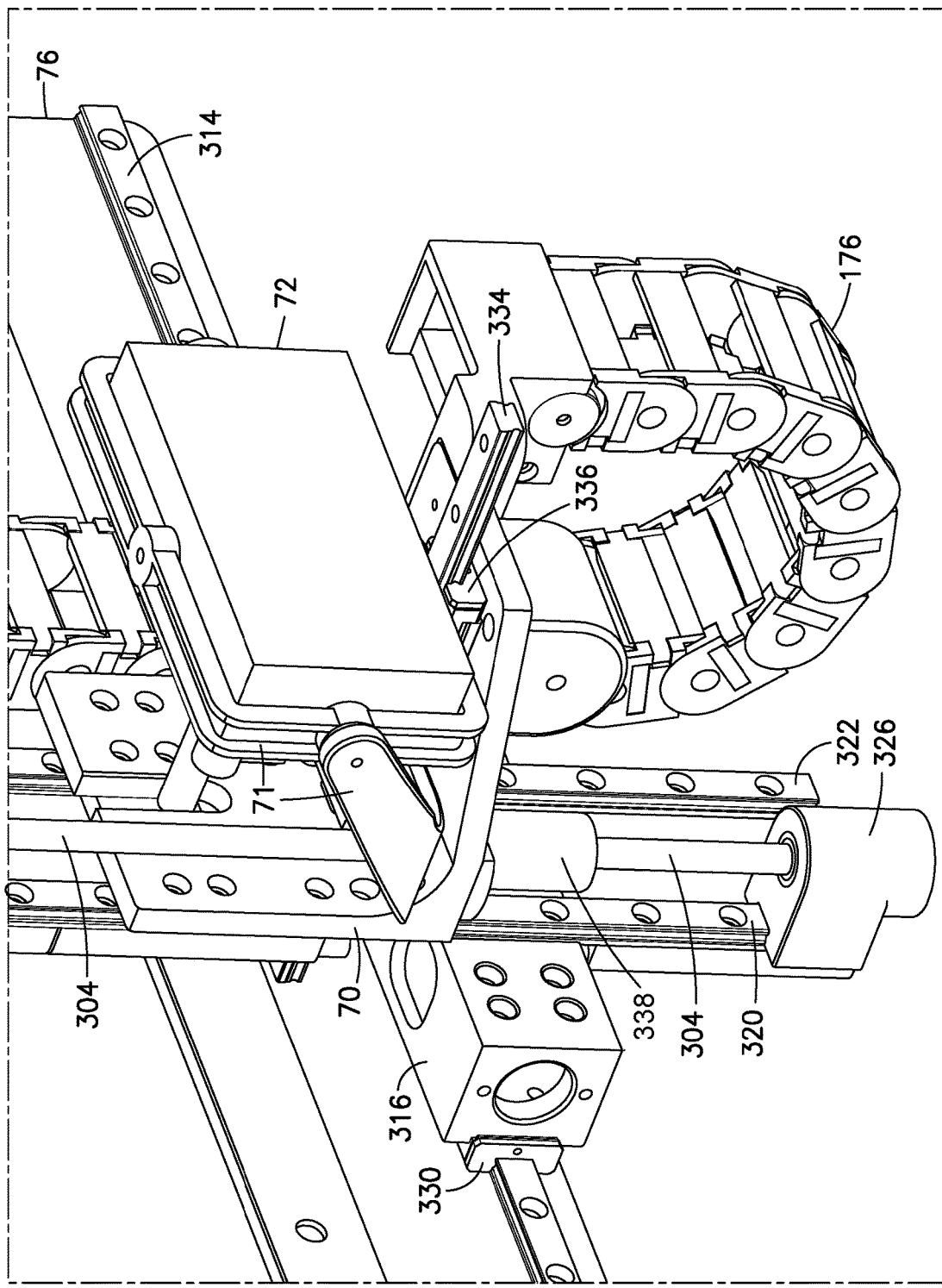

FIGS. 20A and 20B are diagrams representing magnified views of respective portions of the hybrid tool assembly within the respective dashed rectangles 20A and 20B seen in FIG. 20. As shown in FIG. 20A, the traveling bridge 300 is slidably coupled to the horizontal linear rail 312 by means of a slider 328 embedded in block connector 310. As shown in FIG. 20B, the traveling bridge 300 is slidably coupled to the horizontal linear rail 314 by means of a slider 330 embedded in block connector 316.

For the purposes of this disclosure, an X-Y-Z coordinate system will be adopted in which the X direction is parallel to the horizontal linear rails 312 and 314, the Y direction is parallel to the vertical linear rails 320 and 322; and the Z direction is perpendicular to the X and Y directions. The ultrasonic transducer array 72 is slidably coupled to the carriage 70 for translation in the Z direction. The carriage 70 in turn is slidably coupled to the vertical linear rails 320, 322 for translation in the Y direction. The traveling bridge 300 in turn is slidably coupled to the horizontal linear rails 312, 314 for translation in the X direction.

The array support assembly depicted in FIG. 20 further comprises a pair of lead screws 302 and 304. The lead screw 302 is threadably coupled to a lead screw nut (not shown) incorporated inside block connector 316 (see FIG. 20A). The lead screw 304 is threadably coupled to a lead screw nut 338 that is fixedly coupled to the carriage 70 (see FIG. 20B). One end of the lead screw 302 is rotatably seated inside a bearing 308 while the other end is connected to the output shaft of an X-axis motion motor 306. Both bearing 308 and X-axis motion motor 306 are attached to the window frame 76. In alternate embodiments, the horizontal linear rails 312, 314, bearing 308 and X-axis motion motor 306 may be attached to a frame that is directly mounted to the end effector 224 (in which case, the IRT scanner 214 is removed). In addition, one end of the lead screw 304 is rotatably seated inside a bearing 326 while the other end is connected to the output shaft of a Y-axis motion motor 324. Both bearing 326 and Y-axis motion motor 324 are components of the traveling bridge 300. The traveling bridge 300 slides along the horizontal linear rails 312, 314 whenever lead screw 302 is rotated. The carriage 70 slides along the vertical linear rails 320, 322 whenever lead screw 304 is rotated. The direction of translation depends on the direction of lead screw rotation. Thus the ultrasonic transducer array 72 may be scanned in X and Y directions across the surface of the curved workpiece 202 during an ultrasonic inspection procedure.

The array support assembly further comprises a pair of drag chain cable carriers 174 and 176. The drag chain cable carrier 174 carries an electrical cable (not shown) that connects to the Y-axis motion motor 324; the cable carrier 176 carries an electrical cable (not shown) that connects to the ultrasonic transducer array 72. As best seen in FIG. 20B, one end of the cable carrier 176 is pivotably coupled to the carriage 70 and translates vertically in tandem with the carriage 70. The other end of the cable carrier 176 is pivotably coupled to a device not shown in FIG. 20A and translates horizontally in tandem with the traveling bridge 300. Likewise one end of the cable carrier 174 is pivotably coupled to the same device not shown in FIG. 20A and translates horizontally in tandem with the traveling bridge 300. The other end of the cable carrier 174 does not translate.

As best seen in FIG. 20B, the array support assembly further comprises a passive two-axis gimbal 71 which is translatably and rotatably coupled to the carriage 70. The ultrasonic transducer array 72 is mounted to the passive two-axis gimbal 71, which enables the ultrasonic transducer array 72 to adjust its angular positions about X and Y axes. The array support assembly further comprises a fifth linear rail 334 disposed parallel to the Z direction and a slider 336, which enable the passive two-axis gimbal 71 to translate in a Z direction. The slider 336 is attached to the carriage 70; the linear rail 334 moves with the passive two-axis gimbal 71. These features enable the ultrasonic transducer array 72 to self-correct its location during contact with a curved surface by adjusting its position along a Z axis and its pitch and yaw angles about the X and Y axes. The passive two-axis gimbal 71 is spring loaded to provide compliance in the Z direction. There is no motor driving Z axis motion of the gimbal-mounted ultrasonic transducer array 72.

As previously mentioned, the operation of the robotic NDI mobile platforms disclosed herein and other robotic apparatus having an extended-reach arm can be enhanced by the provision of means for stabilizing the end effector 224 relative to the workpiece. Referring to the front view of FIG. 21, the stabilization means employed in the embodiment depicted in FIG. 20 includes four pneumatic stabilizers 34a-34d. Each stabilizer comprises a contactor 154 which is preferably made of elastomeric material to provide traction and preclude scratching of the surface of the curved workpiece 202 when the pneumatic stabilizers 34a-34d are extended into contact.

As partly shown in FIGS. 20 and 22, each pneumatic stabilizer 34a-34d comprises a pneumatic cylinder 155 which is operatively coupled to a pressure regulator 162 by way of a respective solenoid valve 164 and a flexible hose (not shown). The pressure regulator 162 regulates (i.e., reduces) the pressure of the compressed air being supplied via tubing 166, a main air supply 168 and an umbilical cable not shown. The pneumatic cylinders 155 are preferably of the double-acting type, meaning that they are capable of moving the piston in either one of opposite directions to produce either an extend stroke or a retract stroke.

More specifically, each pneumatic cylinder 155 comprises a base cylinder 158, a piston (not visible in FIG. 22) that is slidable inside the base cylinder 158, and a piston rod 157 connected to the piston and extending outside of the base cylinder 158. The contactor 154 is attached to a distal end of the piston rod 157. The states of the solenoid valves 164 are controlled by a computer that is configured in a stabilization mode to activate extension of the piston rods 157 by opening the solenoid valves 164, thereby causing the contactors 154 to move from the retracted position depicted in FIG. 22 to an extended position whereat the contactors 154 all contact the workpiece surface.

The pneumatic stabilizers 34a-34d are compliant at the start of the process in order for all four to make contact the surface with a specific amount of pressure, and they lock in place to keep the assembly from bouncing around while the ultrasonic transducer array 72 is being moved on the surface. Thus each pneumatic stabilizer 34a-34d further comprises a rod lock 160 attached to the base cylinder 158 and configured for locking the piston rod 157 to prevent movement. In accordance with one proposed implementation, the rod lock 160 prevents piston rod movement upon release of stored energy (i.e., the rod lock 160 holds load during power or pressure loss). The rod lock 160 has double-acting locking action for clamping in both directions.

Figure 23:
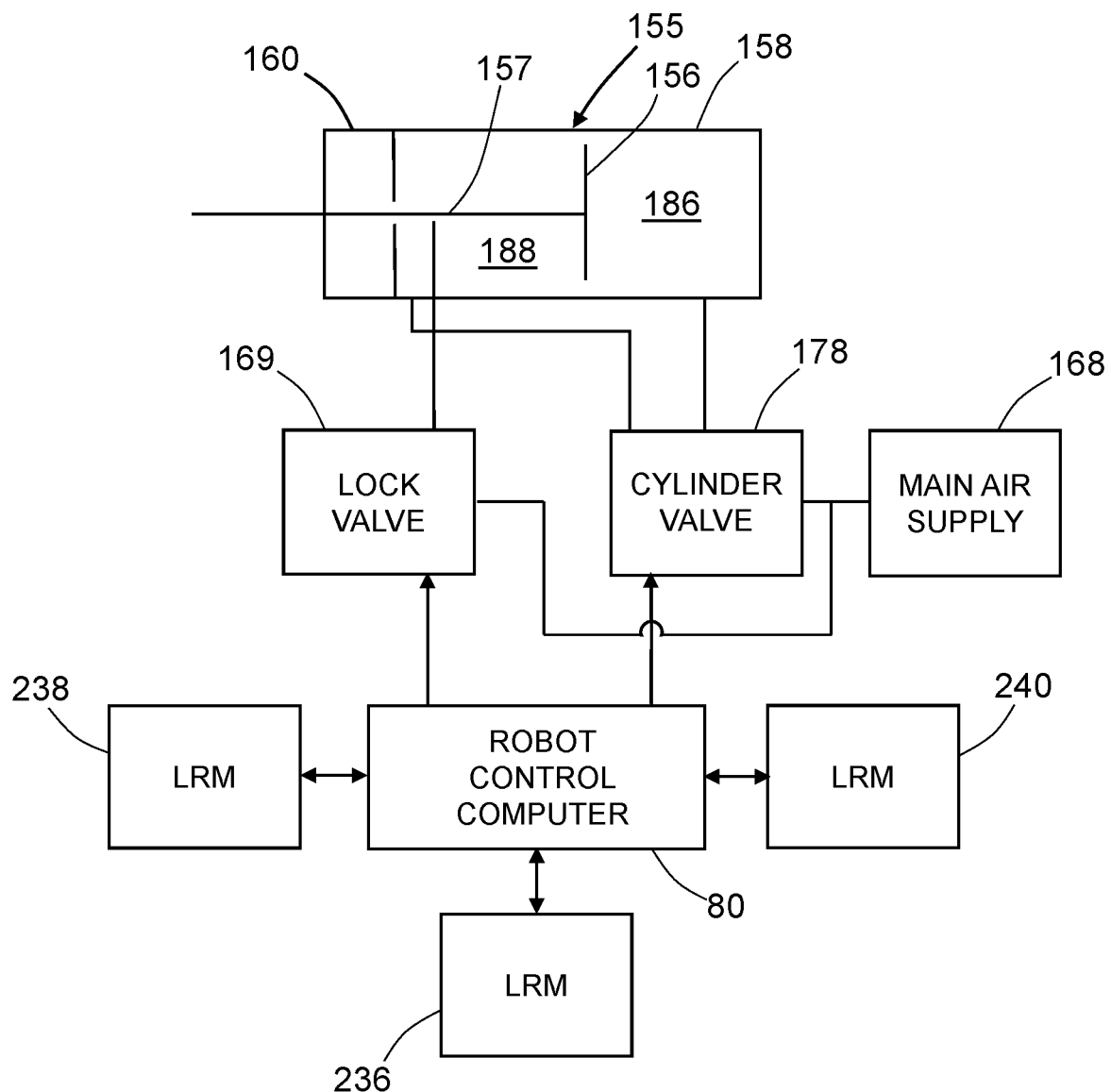
FIG. 23 is a diagram identifying some components of a system for stabilizing a distal end of an extended-reach arm using pneumatic cylinders having rod lock mechanisms.

FIG. 23 is a diagram identifying some components of a system for stabilizing a distal end of an extended-reach arm using pneumatic cylinders 155 having rod lock mechanisms 160. The robot control computer 80 is configured to receive distance measurement data from the laser range meters 236, 238 and 240 and then control the various motors of the automated apparatus to position the end effector 224 in a desired location relative to the area of interest on the workpiece. The robot control computer 80 is also configured to cause the pneumatic stabilizers 34a-34d to extend in unison in response to a stabilize command from the system operator or in response to a self-generated stabilize control signal when the desired location has been achieved. The robot control computer 80 is further configured to cause the rod locks 160 to lock the piston rods 157 in place in response to a lock command from the system operator or in response to a self-generated lock control signal when the contactors all contact the workpiece surface.

Although the robot control computer 80 controls the states of all of the pneumatic stabilizers 34a-34d, FIG. 23 only shows the components of one pneumatic stabilizer for the sake of simplicity. The double-acting pneumatic cylinder 158 has two ports to allow compressed air into either the internal volume 186 behind the piston 156 (for the extend stroke of the piston rod 157) or the internal volume 188 in front of the piston 156 (for the retract stroke of the piston rod 157). Which internal volume is filled with compressed air from a main air supply 168 is dependent on the state of a cylinder valve 178, which state in turn is controlled by the robot control computer 80. The cylinder valve 178 must be energized during extension and retraction of the piston rod 157. It should also be energized at the end of each stroke until a change of direction is required. The pneumatic system further comprises a lock valve 169 that must be energized during piston motion. When the lock valve 169 is not energized, the rod lock 160 is engaged.

Figure 24:
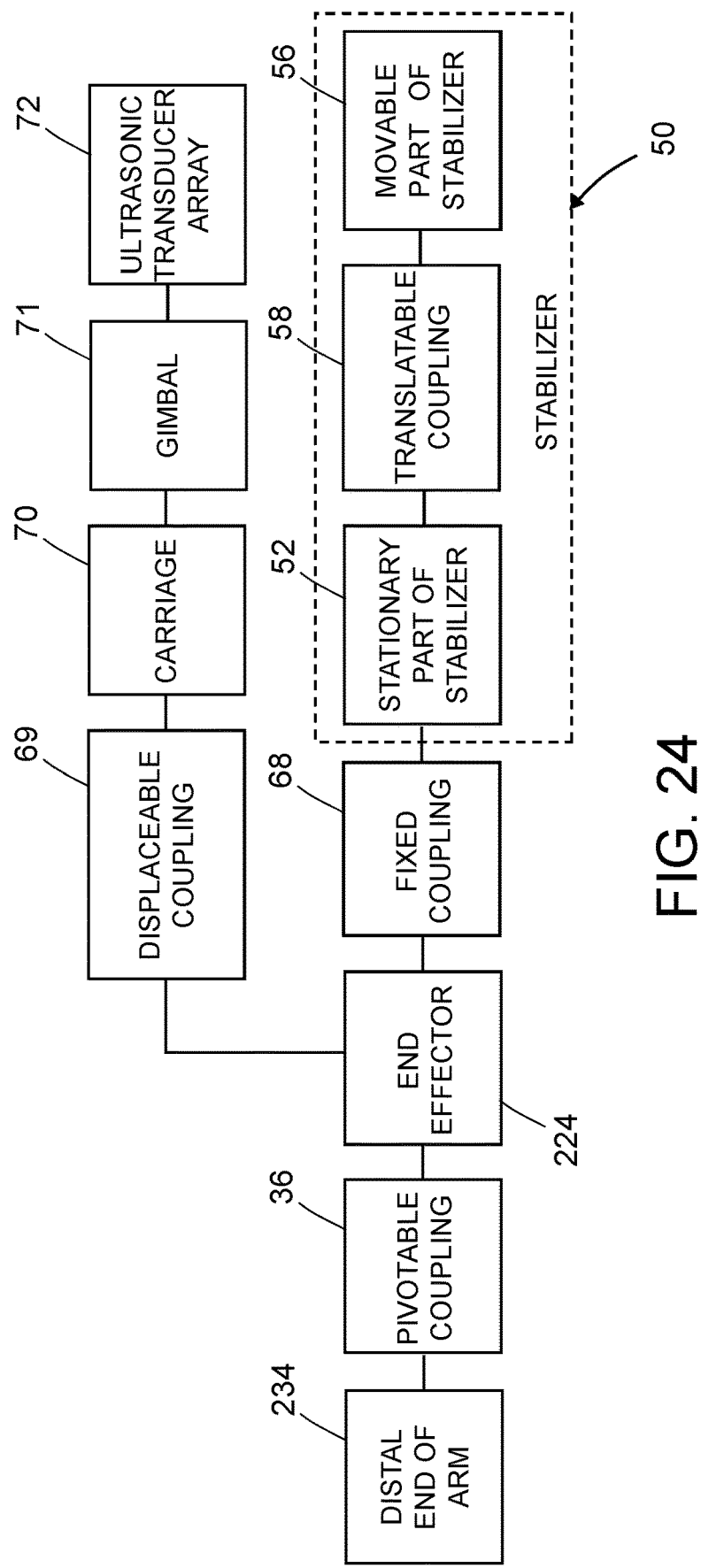
FIG. 24 is a block diagram identifying mechanical couplings used to couple an ultrasonic transducer array and a stabilizer to a distal end of an arm of an automated apparatus in accordance with one embodiment.

In contrast to the apparatus depicted in FIG. 22, in which the ultrasonic transducer array 72 is movably coupled to an IRT scanner 214, the ultrasonic transducer array 72 can be coupled directly to the end effector 224 after the IRT scanner 214 has been removed. FIG. 24 is a block diagram identifying mechanical couplings used to couple an ultrasonic transducer array 72 and a stabilizer 50 to the end effector 224. For the sake of illustration, it will be assumed that the end effector 224 is coupled to a distal end 234 of an arm of an automated apparatus by means of a pivotable coupling 36, meaning that the end effector is pivotable relative to the distal end 234. In alternative embodiments, the end effector 224 can be fixedly coupled to the distal end 234. In this example embodiment, the ultrasonic transducer array 72 is mounted to a gimbal 71, which gimbal 71 is mounted to a carriage 70 that is coupled to the end effector 224 by means of a displaceable coupling 69, meaning that the carriage 70 is displaceable (e.g., in an X-Y plane) relative to the end effector. In addition, a stabilizer 50 is coupled to the end effector 224 by means of a fixed coupling 68. In accordance with these embodiments, the stabilizer 50 comprises a stationary part 52 that is fixedly coupled to the end effector 224 and a movable part 56 that is coupled to the stationary part 52 by means of a translatable coupling 58, meaning that the movable part 56 is translatable relative to the stationary part 52. In the example embodiment depicted in FIG. 20, the base cylinder 158 and rod lock 160 are fixedly coupled to form the stationary part 52 of the stabilizer, while the piston rod 157 is the movable part 56 of the stabilizer.

Figure 25:
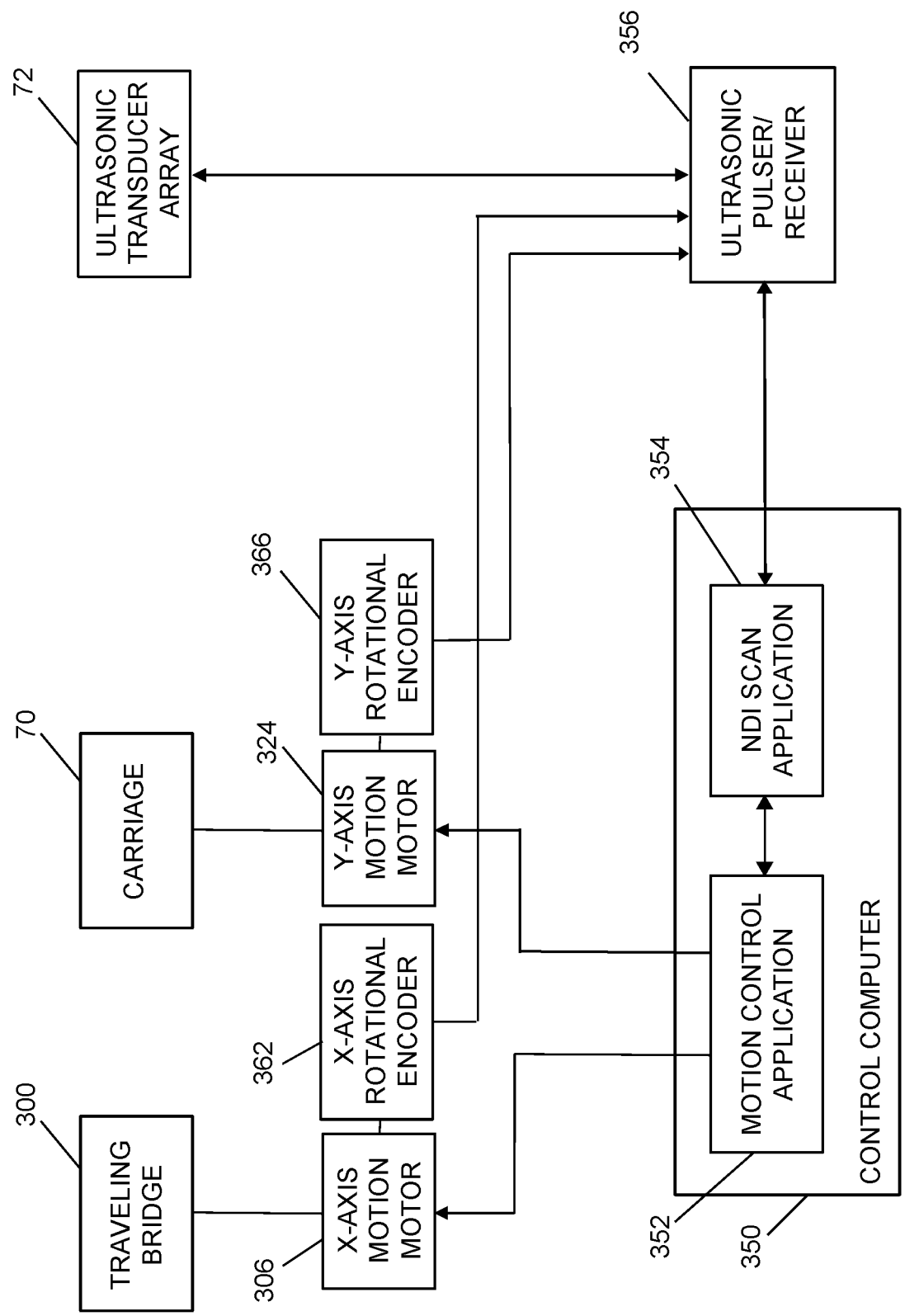
FIG. 25 is a block diagram identifying components of a control system that uses rotation encoders to track the relative location (e.g., relative to an initial location acquired using a local positioning system) of an NDI sensor unit of the type depicted in FIG. 20.

FIG. 25 is a block diagram identifying components of a control system that uses rotation encoders to track the relative location (e.g., relative to an initial location acquired using a local positioning system) of the ultrasonic transducer array 72 depicted in FIG. 20B. The control system comprises a ground-based control computer 350 programmed with motion control application software 352 and NDI scan application software 354. The control computer 350 is connected to an X-axis motion motor 360 (which drives translation of the traveling bridge 300 along the horizontal linear rails 312, 314) and a Y-axis motion motor 364 (which drives translation of carriage 70 along the vertical linear rails 320, 322 of the traveling bridge 300). In accordance with one proposed implementation, the X-axis motion motor 360 and Y-axis motion motor 364 are stepper motors that do not require feedback from external encoders for motion control. The control computer 350 may comprise a general-purpose computer programmed with motion control application software 352 comprising respective software modules for controlling the motors. The motion control application 352 controls the operation of the motors based on rotation feedback from respective rotational encoders, namely, X-axis rotational encoder 362 and Y-axis rotational encoder 366. The rotational counts from the encoders are converted into linear measurements.

The control computer 350 is connected to the motors and encoders via an electronics box (not shown in FIG. 25). The electronics box contains the system power supplies and integrates all the scanner control connections and provides an interface between the control computer 350 and respective flexible electrical cables that connect to the motors. The encoded data from the X-axis rotational encoder 362 and Y-axis rotational encoder 366 are provided to the ultrasonic pulser/receiver 356.

The pulser/receiver 356 sends the encoder pulses to the NDI scan application 354. The NDI scan application 354 uses the encoder values to position the scan data in the proper location.

The control computer 350 hosts ultrasonic data acquisition and display software that controls the ultrasonic pulser/receiver 356. The ultrasonic pulser/receiver 356 in turn sends pulses to and receives return signals from the ultrasonic transducer array 72. The NDI scan application software 354 controls all details of the scan data and the display of data.

Figure 26:
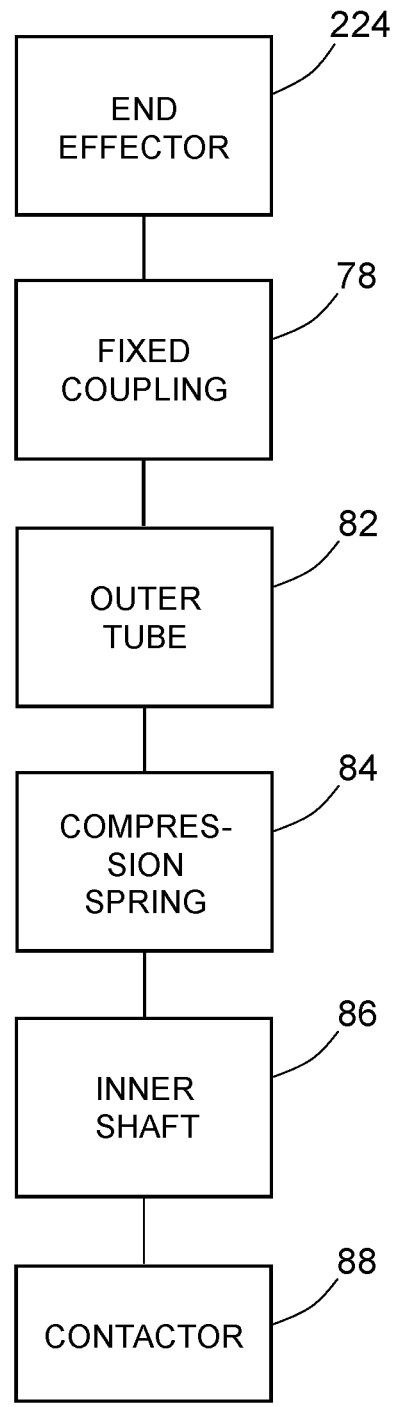
FIG. 26 is a block diagram identifying some components of a stabilizer fixedly coupled to an end effector, which stabilizer comprises telescoped tubes, a spring and a contactor.

FIG. 26 is a block diagram identifying some components of a stabilizer coupled to an end effector 224 by means of a fixed coupling 78 in accordance with an alternative embodiment. In this example, the stabilizer comprises an outer tube 82 fixedly coupled to the end effector 224, an inner shaft 86 telescoped inside the outer tube 82, a contactor 88 mounted to a distal end of the inner shaft 86, a spring 84 that exerts a spring force that urges the inner shaft 86 to extend until the contactor 88 contacts the surface of the workpiece. This type of spring-loaded stabilizer does not require actuation by a control system. It may be useful in some embodiments to have a locking mechanism.

Figure 27:
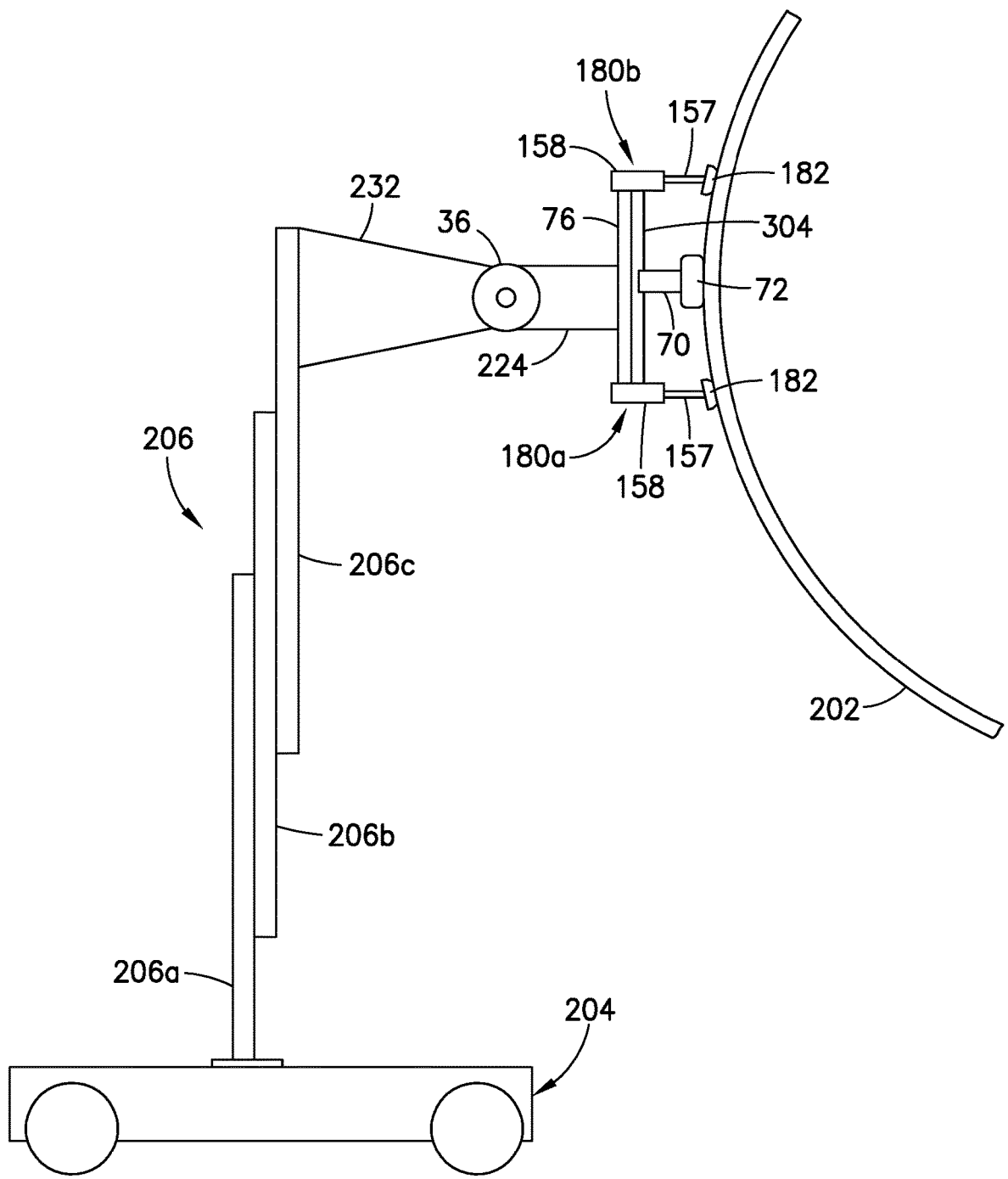
FIG. 27 is a diagram representing a side view of a ground-based robotic NDI mobile platform having a pneumatically stabilized distal end of an arm in accordance with another embodiment.

FIG. 27 is a diagram representing a side view of a ground-based robotic NDI mobile platform having a pneumatically stabilized end effector 224 pivotably coupled to the distal end of an arm 232 in accordance with a further embodiment. In this example, the frame 76 is mounted to the end effector 224. An ultrasonic transducer array 72 is movably coupled to a carriage 70 in the same manner as previously described with reference to FIG. 20B. The carriage 70 is displaceably coupled to the frame 76 in the same manner as previously described with reference to FIGS. 20, 20A and 21 (only lead screw 304 is shown in FIG. 27 to avoid clutter). One difference between the embodiment shown in FIG. 27 and that shown in FIG. 20 is that the four pneumatic stabilizers (only two pneumatic stabilizers 180a and 180b are visible in FIG. 27) each comprise a pivotable contact pad 182 pivotably coupled to the distal end of the piston rod 157. Each pivotable contact pad 182 is preferably made of elastomeric material to provide traction and preclude scratching of the surface of the curved workpiece 202 when the four pneumatic stabilizers (including pneumatic stabilizers 180a and 180b and two additional pneumatic stabilizers not visible in FIG. 27) are in contact with that surface. This embodiment uses contact friction to provide sideways motion resistance, but suction and electrostatic pads could be used instead (or even magnetic if the surface is ferromagnetic).

While systems and methods for stabilizing a tool mounted to an end effector of an extended-reach robotic apparatus have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system. As used in the claims, the term "coupled to" should be construed broadly to encompass direct coupling of two components to each other and coupling of two components by means of intervening components (e.g., a first tool can be coupled to an end effector by attachment to the end effector or by coupling to a second tool or other intervening component which is attached to the end effector). As used in the claims, the term "plurality" means three or more.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An automated apparatus comprising:
an arm having a distal end;
an end effector which is coupled to a distal end of the arm;
a first tool which is coupled to the end effector; and
a stabilizer comprising a stationary part and a movable part, wherein the stationary part has a fixed location relative to the end effector and the movable part is translatably coupled to the stationary part and comprises a contactor disposed at a distal end of the movable part.

2. The automated apparatus as recited in claim 1, wherein the stabilizer comprises a spring.

3. The automated apparatus as recited in claim 2, wherein the stationary part comprises an outer tube, the movable part further comprises an inner shaft slidably disposed inside the outer tube, the contactor is attached to a distal end of the inner shaft; and the spring urges the inner shaft to translate in a direction so that the contactor moves further away from the end effector.

4. The automated apparatus as recited in claim 1, wherein the stationary part comprises a base cylinder, the movable part further comprises a piston that is slidable inside the base cylinder and a piston rod connected to the piston, and the contactor is attached to a distal end of the piston rod.

5. The automated apparatus as recited in claim 4, wherein the stationary part further comprises a rod lock attached to the base cylinder and configured for locking the piston rod to prevent movement.

6. The automated apparatus as recited in claim 1, further comprising a second tool movably coupled to the first tool, wherein the first tool is fixedly coupled to the end effector, and the stationary part of the stabilizer is fixedly coupled to the first tool.

7. The automated apparatus as recited in claim 6, wherein the first tool is an infrared thermography scanner and the second tool is an ultrasonic transducer array.

8. The automated apparatus as recited in claim 1, wherein the first tool is movably coupled to the end effector, and the stationary part of the stabilizer is fixedly coupled to the end effector.

9. The automated apparatus as recited in claim 8, wherein the first tool is an ultrasonic transducer array.

10. The automated apparatus as recited in claim 9, further comprising:
first and second rails which are disposed parallel to a first direction and at respective fixed locations relative to the end effector;
third and fourth rails which are disposed parallel to a second direction perpendicular to the first direction and translatably coupled to the first and second rails for travel in the first direction;
a carriage which is translatably coupled to the third and fourth rails for travel in the second direction;
a fifth rail mounted to the carriage and disposed perpendicular to the first and second directions; and
a gimbal which is translatably coupled to the fifth rail for travel in a third direction,
wherein the ultrasonic transducer array is mounted to the gimbal.

11. The automated apparatus as recited in claim 1, wherein the contactor comprises a pivotable contact pad.

12. The automated apparatus as recited in claim 1, wherein the contactor is made of elastomeric material.

13. The automated apparatus as recited in claim 1, further comprising a plurality of stabilizers of a type having the structure recited in claim 1.

14. A method for performing a maintenance operation, comprising:
(a) moving a robotic mobile platform to a first location where a tool at a distal end of an arm is able to reach a first area of interest on a surface of a target object;
(b) configuring the robotic mobile platform such that an end effector is at a correct location relative to the first area of interest;
(c) extending contactors of a plurality of stabilizers into contact with the surface of the target object, which stabilizers are coupled to the arm;
(d) locking the contactors of the stabilizers in place to maintain the end effector at the correct location relative to the first area of interest; and (e) performing a first maintenance operation using the tool while the end effector is maintained at the correct location relative to the first area of interest.

15. The method as recited in claim 14, further comprising:
(f) unlocking the contactors of the stabilizers upon completion of the maintenance operation;
(g) retracting the contactors of the stabilizers;
(h) moving the robotic mobile platform to a second location where the tool is able to reach a second area of interest on the surface of the target object;
(i) configuring the robotic mobile platform such that the end effector is at a correct location relative to the second area of interest;
(j) extending contactors of a plurality of stabilizers into contact with the surface of the target object;
(k) locking the contactors of the stabilizers in place to maintain the end effector at the correct location relative to the second area of interest; and
(l) performing a second maintenance operation using the tool while the end effector is maintained at the correct location relative to the second area of interest.

16. The method as recited in claim 14, wherein the configuring comprises rotating the end effector so that an axis of the end effector is perpendicular to the surface of the target object in the area of interest.

17. The method as recited in claim 14, wherein the configuring comprises displacing the end effector so that the end effector is separated from the surface of the target object by a goal offset distance.

18. A method for performing a maintenance operation, comprising:
(a) coupling a tool to an end effector, which end effector in turn is coupled to a distal end of an arm of an automated apparatus;
(b) activating the automated apparatus to perform an alignment operation that locates the tool at a location relative to an area of interest on a surface of a target object;
(c) extending contactors of a plurality of stabilizers coupled to the distal end of the arm into contact with the surface of the target object while the tool is at the location; and
(d) activating the tool to perform a maintenance operation while the contactors are in contact with the surface of the target object.

19. The method as recited in claim 18, wherein the maintenance operation is non-destructive inspection of a portion of the target object.

20. The method as recited in claim 18, further comprising locking the contactors of the stabilizers in place while they are in contact with the surface of the target object before activating the tool.

21. An automated apparatus comprising:
a base platform comprising wheels;
an arm movably coupled to the base platform and having a distal end;
an end effector which is pivotably coupled to the distal end of the arm;
a tool which is coupled to the end effector; and
a stabilizer coupled to the tool or to the end effector and comprising a rod and a contactor disposed at a distal end of the rod, wherein the rod is selectively extendible or retractable and the contactor is made of elastomeric material.

22. The automated apparatus as recited in claim 21, wherein the stabilizer comprises a pneumatic cylinder that is operable to extend or retract the rod.

23. The automated apparatus as recited in claim 22, wherein the stabilizer further comprises a rod lock attached to the pneumatic cylinder and configured for locking the rod to prevent movement.

\* \* \* \* \*